(12) United States Patent
Shi et al.

(10) Patent No.: US 11,984,644 B2
(45) Date of Patent: May 14, 2024

(54) ANTENNA PLACEMENT ARRANGEMENTS ON DEVICE WITH EXTENDABLE DISPLAY

(71) Applicant: Futurewei Technologies, Inc., Plano, TX (US)

(72) Inventors: Ping Shi, San Diego, CA (US); Wei Huang, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 312 days.

(21) Appl. No.: 17/486,484

(22) Filed: Sep. 27, 2021

(65) Prior Publication Data

US 2022/0069444 A1    Mar. 3, 2022

Related U.S. Application Data

(62) Division of application No. 15/720,964, filed on Sep. 29, 2017, now Pat. No. 11,158,929.

(51) Int. Cl.
*H01Q 1/22* (2006.01)
*G06F 1/16* (2006.01)
(Continued)

(52) U.S. Cl.
CPC .............. *H01Q 1/243* (2013.01); *G06F 1/16* (2013.01); *G06F 1/1618* (2013.01);
(Continued)

(58) Field of Classification Search
CPC ........ H01Q 1/243; H01Q 1/2266; H01Q 3/24; H01Q 1/521; H01Q 21/28; H01Q 1/36; H01Q 1/48; H01Q 21/29; G06F 1/16; G06F 1/1618; G06F 1/1681; G06F 1/1652; G06F 1/1647; G06F 1/1677; G06F 1/1683;
(Continued)

(56) References Cited

U.S. PATENT DOCUMENTS 8,204,466 B2  6/2012  Aytur
8,626,083 B2  1/2014  Greene et al.
(Continued)

FOREIGN PATENT DOCUMENTS

CN  1399368 A  2/2003
CN  1437778 A  8/2003
(Continued)

OTHER PUBLICATIONS

Van Boom, Daniel, https://www.cnet.com/news/a-folding-iphone-could-be-in-your-future/, "A folding iPhone could be in your future", CNET, Nov. 2, 2016, 3 pages.
(Continued)

*Primary Examiner* — Hai V Tran
*Assistant Examiner* — Michael M Bouizza
(74) *Attorney, Agent, or Firm* — Slater Matsil, LLP

(57) ABSTRACT

An electronic device includes a housing having a first panel connected to a second panel movable between folded and unfolded configurations. A first antenna is located adjacent to the first panel and a second antenna is located adjacent to the second panel. The second antenna is activated when the housing is in an unfolded configuration and is deactivated when the housing is in a folded configuration.

21 Claims, 15 Drawing Sheets

(51) Int. Cl.
*H01Q 1/24* (2006.01)
*H04B 7/02* (2018.01)
*H04W 88/02* (2009.01)
*H01Q 3/24* (2006.01)

(52) U.S. Cl.
CPC ......... *G06F 1/1681* (2013.01); *H01Q 1/2266* (2013.01); *H04B 7/02* (2013.01); *H04W 88/02* (2013.01); *G06F 1/1652* (2013.01); *H01Q 3/24* (2013.01)

(58) Field of Classification Search
CPC ....... G06F 1/1698; H04B 7/02; H04B 7/0413; H04W 88/02
See application file for complete search history.

(56) References Cited

U.S. PATENT DOCUMENTS

| | | | |
|---|---|---|---|
| 9,407,335 | B2 | 8/2016 | Ramasamy et al. |
| 9,485,862 | B2 | 11/2016 | Kamei et al. |
| 2003/0013490 | A1 | 1/2003 | Shoji et al. |
| 2006/0025185 | A1 | 2/2006 | Shoji et al. |
| 2006/0118625 | A1 | 6/2006 | Sekita |
| 2008/0081657 | A1 | 4/2008 | Suzuki et al. |
| 2008/0106477 | A1 | 5/2008 | Mashima et al. |
| 2010/0238079 | A1* | 9/2010 | Ayatollahi ............ H01Q 1/521 343/729 |
| 2010/0297971 | A1 | 11/2010 | Persson |
| 2013/0076591 | A1 | 3/2013 | Sirpal et al. |
| 2014/0240178 | A1 | 8/2014 | Chun et al. |
| 2015/0099474 | A1 | 4/2015 | Yarga et al. |
| 2017/0142241 | A1 | 5/2017 | Kim et al. |
| 2017/0229760 | A1* | 8/2017 | Karilainen ........... H01Q 1/2266 |
| 2017/0346164 | A1 | 11/2017 | Kim et al. |

FOREIGN PATENT DOCUMENTS

| | | |
|---|---|---|
| CN | 1522028 A | 8/2004 |
| CN | 1902562 A | 1/2007 |
| CN | 101185195 A | 5/2008 |
| CN | 101222530 A | 7/2008 |
| CN | 102280695 A | 12/2011 |
| CN | 102544753 A | 7/2012 |
| CN | 103199341 A | 7/2013 |
| CN | 103326105 A | 9/2013 |
| CN | 105940554 A | 9/2016 |
| EP | 1443590 A2 | 8/2004 |
| EP | 3343693 A1 | 7/2018 |
| JP | 2004072605 A | 3/2004 |
| JP | 2004166284 A | 6/2004 |
| JP | 2006014128 A | 1/2006 |
| JP | 2008085869 A | 12/2011 |
| KR | 20140105886 A | 9/2014 |
| WO | 2011152427 A1 | 12/2011 |

OTHER PUBLICATIONS

Rana, Gogi, "YotaPhone with dual 4.3 inch screen launched in Russia", https://www.gogi.in/yotaphone-dual-screen.html, Dec. 4, 2013, 10 pages.

* cited by examiner

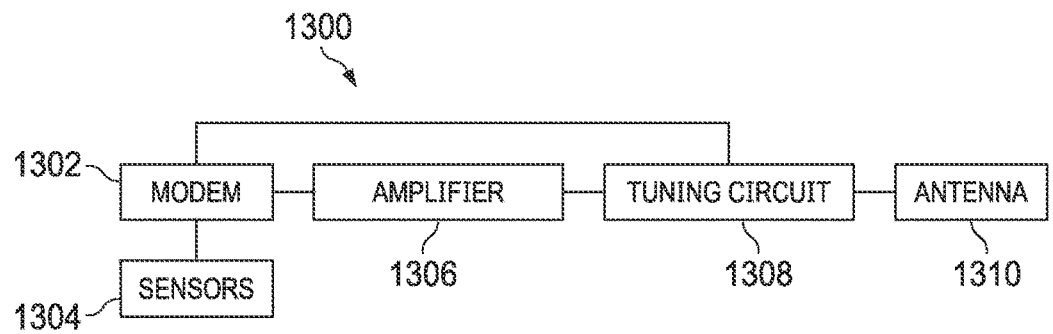
FIG. 13A
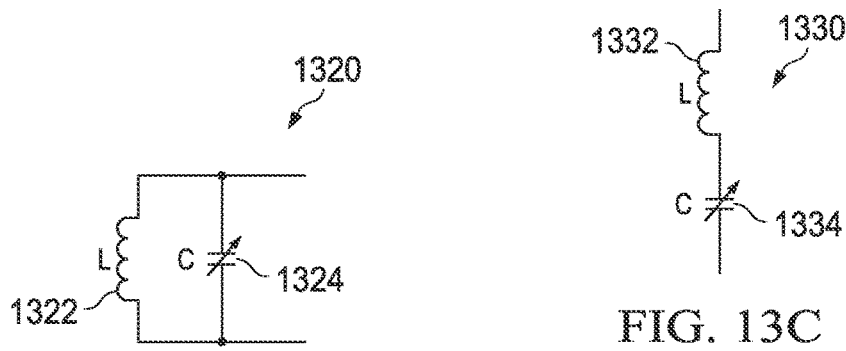
FIG. 13B
FIG. 13C
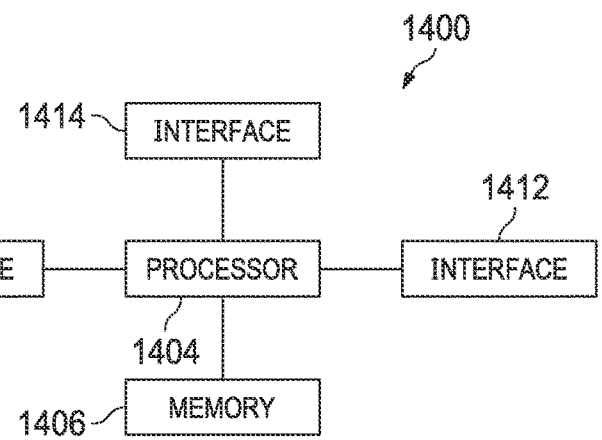
FIG. 14
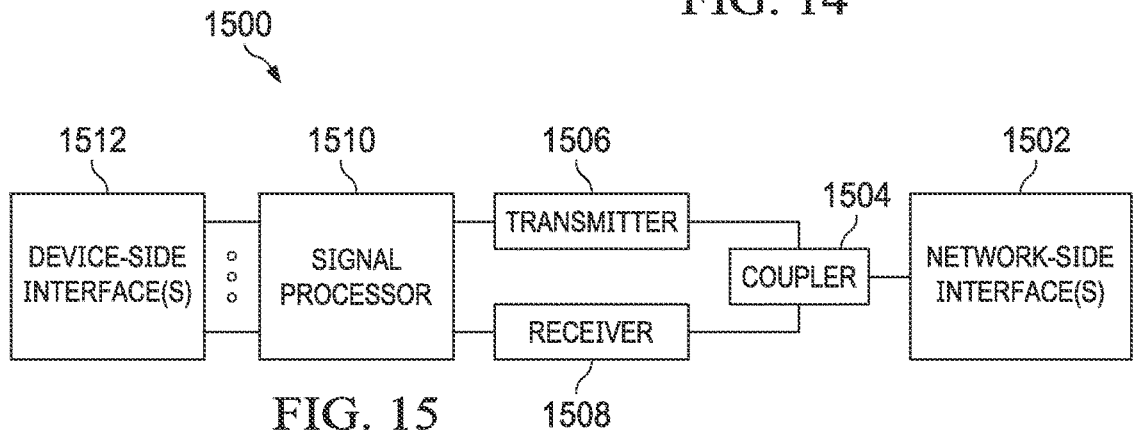
FIG. 15

ANTENNA PLACEMENT ARRANGEMENTS ON DEVICE WITH EXTENDABLE DISPLAY

CROSS REFERENCE TO RELATED APPLICATIONS

This is application is a divisional of U.S. Parent application Ser. No. 15/720,964, filed on Sep. 29, 2017, now U.S. Pat. No. 11,158,929 issued on Oct. 26, 2021, and entitled "Antenna Placement Arrangements on Device with Extendable Display," which application is hereby incorporated by reference herein as if reproduced in its entirety.

TECHNICAL FIELD

The present disclosure relates generally to an electronic device, and in particular embodiments, to a system for antenna placement arrangements on a device with an extendable display.

BACKGROUND

Portable wireless devices, such as mobile phones, tablets, and notebooks, are increasingly used to stream movies, play games, and perform business activities. One challenge in designing portable wireless devices is that their compact form factor often limits the size, number, and potential placement, of antenna elements on the device. This design challenge may become increasingly complex as advances in wireless transmission and/or reception techniques (e.g., high-order multiple-input multiple-output (MIMO), beamforming, etc.) require the inclusion of additional antenna elements in an already crowded space.

SUMMARY

Technical advantages are generally achieved by embodiments of this disclosure which describe systems and methods for placement and selection of antennas.

In accordance with an embodiment, an apparatus for placement and selection of antennas is provided. In this embodiment, the apparatus includes a housing having a first panel coupled to a second panel, a first antenna positioned adjacent to the first panel, and a second antenna positioned adjacent to the second panel, wherein the second antenna is activated when the housing is in an unfolded configuration and the second antenna is deactivated when the housing is in a folded configuration. In one example, a shorting connection between the second antenna and a ground plane is formed when the housing is transitioned from the unfolded configuration to the folded configuration. Optionally, in such an example, or in another example, the shorting connection between the second antenna and the ground plane is broken when the housing is in the unfolded configuration. Optionally, in any one of the above mentioned examples, or in another example, the shorting connection is formed when the second antenna comes into direct or indirect contact with the ground plane incident to placement of the housing in the folded configuration. Optionally, in any one of the above mentioned examples, or in another example, the shorting connection is formed by a switch that is configured to close when the housing is placed in the folded configuration. Optionally, in any one of the above mentioned examples, or in another example, the apparatus further includes a first display disposed in the first panel, a first ground plane region positioned adjacent to the first display, a second display disposed in the second panel, and a second ground plane region positioned adjacent to the second display. The second ground plane and the first ground plane are part of a common ground plane, and a ground plane slot structure positioned between the first ground plane region and the second ground plane region electrically isolating the first antenna from the second antenna. Optionally, in any one of the above mentioned examples, or in another example, the ground plane slot structure is formed of a dielectric material having an approximate electrical length corresponding to a quarter wavelength of an operating frequency of one of the first or second antennas. Optionally, in any one of the above mentioned examples, or in another example, the ground plane slot structure is a resonator having an approximate electrical length corresponding to a quarter wavelength of an operating frequency of one of the first or second antennas. Optionally, in any one of the above mentioned examples, or in another example, the first display is active when the housing is in the folded configuration, and the first display and the second display are both active when the housing is in an unfolded configuration. Optionally, in any one of the above mentioned examples, or in another example, the ground plane slot structure is provided with a passage configured to carry one or more of data or power signals between the first panel and the second panel. Optionally, in any one of the above mentioned examples, or in another example, the apparatus further includes a continuous ground plane positioned adjacent to a first display disposed in the first panel and a second display disposed in the second panel. Optionally, in any one of the above mentioned examples, or in another example, the second antenna is selected in accordance with one or more of received signal strength indication (RSSI), received signal code power (RSCP), bit error rate (BER), symbol error rate (SER), negative acknowledgement (NAK)/acknowledgement (ACK) ratio, link control based information, and power control bit (PCB). Optionally, in any one of the above mentioned examples, or in another example, the second antenna operates as a diversity antenna to the first antenna. Optionally, in any one of the above mentioned examples, or in another example, each of the first antenna and the second antenna being configured as multiple-input and multiple-output (MIMO) antennas.

In accordance with another embodiment, an apparatus for placement and selection of antennas is provided. In this embodiment, the apparatus includes a housing, a first antenna positioned in the first antenna region, and a second antenna positioned in the second antenna region. The housing having a first panel coupled to a second panel, the first panel having a first antenna region, the second panel having a second antenna region, wherein the first panel and second panel face away from each other when the housing is in a folded configuration. The first antenna being electrically isolated from the second antenna, and wherein the second antenna is activated when the housing is in an unfolded configuration and deactivated when the housing is in the folded configuration. In one example, a shorting connection between the second antenna and a ground plane is formed when the housing is transitioned from the unfolded configuration to the folded configuration. Optionally, in any one of the above mentioned examples, or in another example, the shorting connection between the second antenna and the ground plane is broken when the housing is in the unfolded configuration. Optionally, in any one of the above mentioned examples, or in another example, the shorting connection is formed when the second antenna comes into direct or indirect contact with the ground plane, the direct or indirect contact resulting from an orientation of the second antenna to the ground plane when the housing is placed in the folded configuration. Optionally, in any one of the above mentioned examples, or in another example, the shorting connection is formed by a switch coupled to the housing and is configured to close when the housing is placed in the folded configuration. Optionally, in any one of the above mentioned examples, or in another example, the apparatus further includes a third panel including a third antenna region, wherein a third antenna is arranged in the third antenna region, and wherein the third antenna is electrically isolated from the first antenna. Optionally, in any one of the above mentioned examples, or in another example, at least one of the first and third antennas is operable when the housing is in an unfolded configuration, and wherein a shorting connection between the third antenna and a ground plane is formed when the housing is transitioned from the unfolded configuration to the folded configuration. Optionally, in any one of the above mentioned examples, or in another example, the housing further includes a continuous ground plane disposed in the first panel and the second panel. Optionally, in any one of the above mentioned examples, or in another example, the second antenna region does not overlap the first antenna region when the housing is in a folded configuration. Optionally, in any one of the above mentioned examples, or in another example, the first antenna and the second antenna are a different type of wireless antenna. Optionally, in any one of the above mentioned examples, or in another example, the second antenna operates as a diversity antenna to the first antenna. Optionally, in any one of the above mentioned examples, or in another example, the first antenna and the second antenna are in a multiple-input and multiple-output (MIMO) antenna configuration. Optionally, in any one of the above mentioned examples, or in another example, the apparatus further includes a main display region disposed in the first panel and an auxiliary display region disposed in the second panel. The main display region being active when the housing is in the folded configuration and the main display region and the auxiliary display region being active when the housing is in an unfolded configuration. Optionally, in any one of the above mentioned examples, or in another example, the apparatus further includes a first ground plane region disposed in the first panel and adjacent to the main display region, a second ground plane region disposed in the second panel and adjacent to the auxiliary display region, and a ground plane slot structure coupling the first ground plane region to the second ground plane region. The first ground plane region and the second ground plane region forming a common ground plane. The ground plane slot structure being configured with an approximate electrical length corresponding to a quarter wavelength of an operating frequency of a cellular antenna of the electronic device. Optionally, in any one of the above mentioned examples, or in another example, the first antenna is electrically isolated from the second antenna via the ground plane slot structure. Optionally, in any one of the above mentioned examples, or in another example, the ground plane slot structure includes a passage configured to carry one or more of data or power signals between the first panel and the second panel. Optionally, in any one of the above mentioned examples, or in another example, the ground plane slot structure includes a dielectric or a resonator.

BRIEF DESCRIPTION OF THE DRAWINGS

For a more complete understanding of the present invention, and the advantages thereof, reference is now made to the following descriptions taken in conjunction with the accompanying drawings, in which:

FIGS. 13A-C illustrate an embodiment active tuner network and embodiment schematics of conventional tuning circuits;

FIG. 14 illustrates a block diagram of an embodiment processing system for performing methods described herein; and FIG. 15 illustrates a block diagram of a transceiver adapted to transmit and receive signaling over a telecommunications network.

DETAILED DESCRIPTION OF ILLUSTRATIVE EMBODIMENTS

Figure 1A:
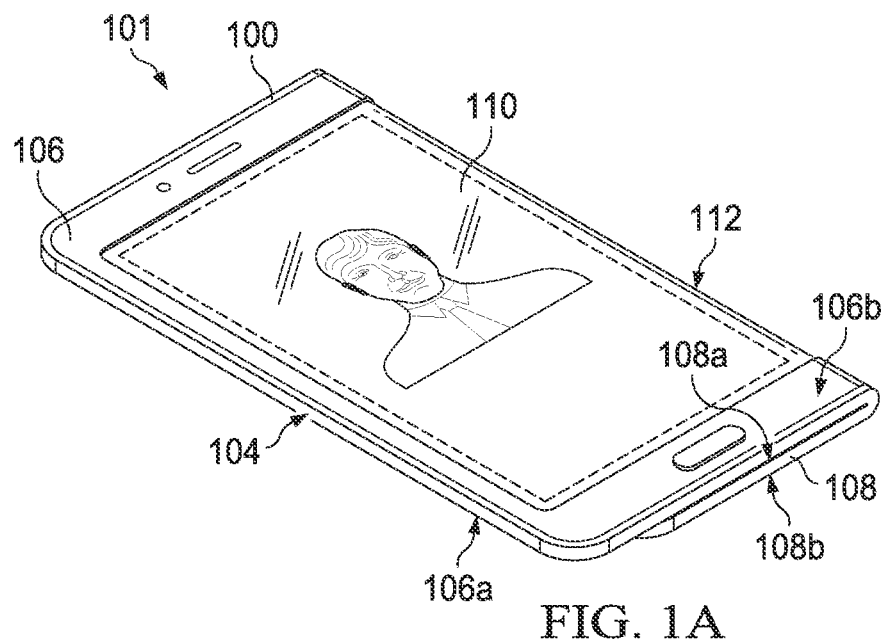
FIGS. 1A-D illustrate an embodiment electronic device in a folded and unfolded configuration at various viewing angles.
Figure 1B:
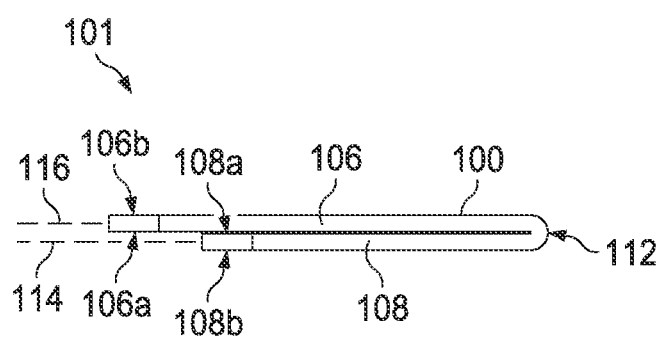

This disclosure provides many applicable inventive concepts that can be embodied in a wide variety of specific contexts. The specific embodiments discussed are merely illustrative of specific configurations and do not limit the scope of the invention.

Electronic devices, such as portable wireless devices, may include a foldable housing to provide an expandable viewing area while still allowing the device to maintain a relatively compact form factor for ease of transportability. As used herein, the term "foldable housing" refers to a structural arrangement of components that includes two panels coupled together via a linkage (e.g., a hinge, a rotating or sliding joint, etc.), which can be adjusted to manipulate the relative geometric orientation of display regions disposed on the respective panels. The display regions disposed on the respective panels may be different areas on the same flexible display or areas on different displays. A foldable housing is said to be in a "folded configuration" when display regions disposed on the respective panels are on different geometric planes, as may occur when one of the panels is folded behind the other panel such that the display regions overlap—either in an opposed, facing orientation or facing in opposite directions. A foldable housing is said to be in an "unfolded configuration" when display regions disposed on the respective panels are substantially the same geometric plane, as may occur when one of the panels is unfolded, or otherwise extended out, from behind the other panel. In this way, the electronic device may have a relatively compact form factor for ease of portability when the foldable housing is placed in the folded configuration, while still having the capability to provide a larger viewing-area for the user when the foldable housing is placed in the unfolded configuration.

A electronic device generally exhibits a larger exposed surface area when its foldable housing is placed in the unfolded configuration, and consequently the wireless device may be capable of supporting a more complex antenna configuration (e.g., greater numbers of active antenna elements) when its foldable housing is in the unfolded configuration than when it is in the folded configuration. Embodiments of this disclosure provide foldable housing designs/configurations that dynamically activate additional antennas when a device's foldable housing is transitioned from a folded configuration to an unfolded configuration, as well as deactivate the additional antennas when the device's foldable housing is transitioned back to the folded configuration. In an embodiment, the foldable housing is configured such that a shorting connection is formed between one or more of the antennas and a ground plane when the foldable housing is placed in the folded configuration, and broken when the foldable housing is placed in the unfolded configuration. In one example, the shorting connection is formed by the opening/closing of a switch when the housing is placed in the folded configuration. In another example, the shorting connection is formed by virtue of a physical orientation of the antenna to the ground plane on the foldable housing such that the antenna comes into direct or indirect contact with the ground plane when the foldable housing is placed in the folded configuration.

In an embodiment, an electronic device is provided with a housing that may include a first panel connected to a second panel. A first antenna may be located in the first panel and a second antenna may be located in the second panel. The electronic device may also include a first display on the front-side of the first panel and a second display on the front-side of the second panel. In the folded configuration, the first display may be independently activated and the second antenna may be deactivated by shorting the second antenna to a ground plane on the backside of the first panel. In the unfolded configuration, the first display and the second display may both be active. In this embodiment, an electronic or mechanical switch can activate the second antenna when the housing is in the unfolded configuration, and a data signal may be transmitted/received using one or both antennas. When fewer than all of the activated antennas are used to simultaneously transmit/receive data signals during a given time period, then the antenna(s) that are used for data transmission may be selected according to one or more of received signal strength indication (RSSI), received signal code power (RSCP), bit error rate (BER), symbol error rate (SER), negative acknowledgement (NAK)/acknowledgement (ACK) ratio, link control based information, or power control bit (PCB). When multiple antennas are used for data transmissions, the first antenna and the second antenna may operate as diversity antennas as well as be used for multiple-input and multiple-output (MIMO) data transmission/reception.

In an embodiment, a first ground plane region may be located beneath the first display and a second ground plane region may be located beneath the second display, where the first ground plane and the second ground plane are part of a common ground plane. A ground plane slot structure may be located between the first ground plane region and the second ground plane region, and can electrically isolate the first antenna from the second antenna. The ground plane slot structure may be a dielectric or a resonator having an approximate electrical length corresponding to a quarter wavelength of an operating frequency of one of the device antennas. The ground plane slot structure may have an opening to allow one or more of data or power signals to be routed between the first panel and the second panel.

In an embodiment, a third antenna region including a third antenna may be provided in the second panel. The third antenna can be electrically isolated from the first antenna and can be an alternative to the first antenna when the housing is in the unfolded configuration.

Figure 1C:
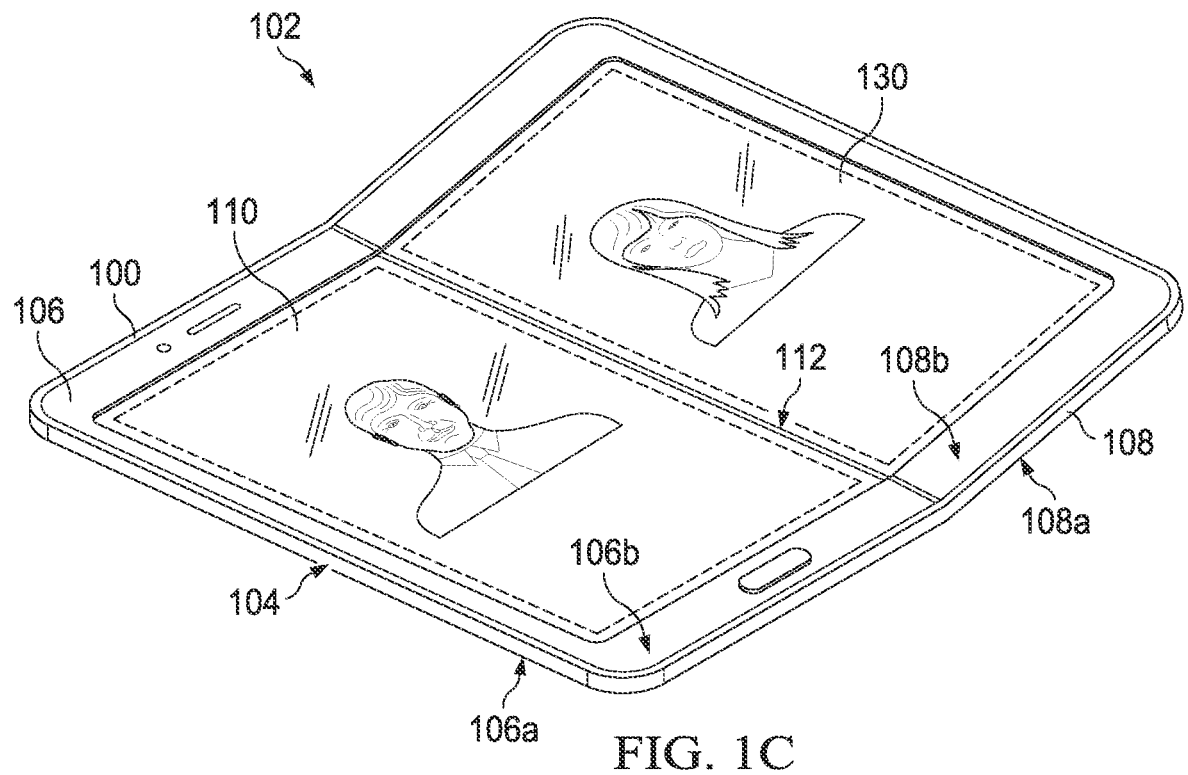
Figure 1D:
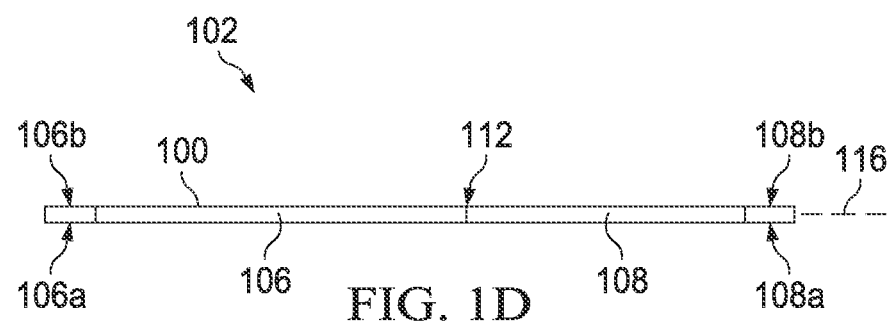

FIGS. 1A-D illustrate an embodiment electronic device 100 that includes a housing 104 that can be adjusted between a folded configuration 101 (FIG. 1A-B) and an unfolded or "open" configuration 102 (FIG. 1C-D). The housing includes first and second sections 106, 108, respectively. Housing section 106 includes an outer surface 106a and an inner surface 106b. Likewise, housing section 108 includes an outer surface 108a and an inner surface 108b. Housing portions 106 and 108 can be in the form of discrete sections connected to one another along a surface 112 that can be in the form of a fold line, hinge or other suitable structure that allows for relative movement of the housing portions 106, 108. Surface 112 can be continuous or non-continuous. When the housing of the electronic device 100 is in the folded configuration 101, an auxiliary display region 130 of the electronic device 100 is folded behind, or at least partially overlaps with, a main display region 110 of the electronic device 100 such that the main display region 110 and the auxiliary display region 130 are on different geometric planes 114, 116 and face externally to render both displays viewable to the user. In this configuration, the outer surface 106a of first housing portion 106 is generally in contact with the outer surface 108a of second housing portion 108. Although FIGS. 1A-1D depict the housing 104 as outwardly facing such that the display regions 110, 130 face away from one another and are exposed, or otherwise viewable, when the housing 104 is in the folded configuration 101, it should be appreciated that embodiment housings may also be configured to fold inwardly such that the respective display regions 110, 130 face towards one another and are protected from the elements. Other examples are also possible. For instance, an embodiment housing could be configured such that one display region folds, or otherwise slides, behind the other display region, in which case one of the display regions would be exposed and/or viewable, while the other display region is protected from the elements.

In the unfolded configuration 102, the auxiliary display region 130 of the electronic device 100 is extended out from behind, or otherwise positioned alongside, the main display region 110 such that the main display region 110 and the auxiliary display region 130 are on the same, or substantially similar, geometric plane 116.

The housing of the electronic device 100 may include any mechanical support structure that allows the main display region 110 and/or auxiliary display region 130 to be manipulated in the manner described herein. For example, the housing of the electronic device 100 may include panels that are affixed to the main display region 110 and the auxiliary display region 130, as well as a linkage (e.g., a hinge, a rotating or sliding joint, etc.) coupling the respective panels that is adapted to allow the housing to be adjusted from the folded configuration 101 to the unfolded configuration 102, and vice-versa. As another example, the panels may be separate devices that can be configured into one device when coupled to each other. The act of coupling activates the display region on one panel as an auxiliary display to a main display on another panel.

The housing of the electronic device 100 is generally composed of a conductive metal (e.g., aluminum, magnesium, etc.), plastic (polycarbonates, etc.), glass (e.g., aluminosilicate glass, etc.), and/or other materials (e.g., composites) that provide similar rigidity, strength and/or durability. In an embodiment, parts of the metal in the panels may be used as an external antenna. In another embodiment, the panels may be made of metal and have plastic or glass openings or be made of plastic or glass to allow for reception or transmission of an internal antenna.

In an embodiment, the electronic device 100 may have an active antenna tuner network with impedance sensing circuits that sense a detuning of the antenna, for example, as a result of a user's hand interfering with the transmission/reception of wireless signals by the antenna. An active antenna tuner network and a few examples of a tuning circuit are provided in FIGS. 13A-C, which are described in greater detail below. The active antenna tuner network may correct for the mismatch by changing the capacitance of a tunable capacitor or switching the state of a switch connected in a tuning circuit. In another embodiment, the electronic device 100 may have an active tunable antenna with tunable capacitor or switch to reconfigure antenna aperture or matching. The electronic device 100 will acquire the folding state of the device and reconfigure the tunable capacitor or switch to achieve optimal antenna performance.

The main display region 110 and auxiliary display region 130 may belong to the same display screen or different display screens. In one embodiment, the main display region 110 and the auxiliary display region 130 are different regions on the same, continuous, flexible display. In such embodiment, the flexible display may be manipulated to allow the auxiliary display 130 to be bent around and behind the main display 110 when the housing is in the folded configuration 101.

Although the electronic device 100 is depicted as including a single auxiliary display region 130 of approximately the same size and shape as the main display region 110, it should be appreciated that, in other embodiments, electronic devices may have multiple auxiliary displays of varying shapes and sizes. As an example, additional auxiliary displays may be folded accordion style behind a main display of the device. In another embodiment (not shown), some but not all of the auxiliary displays may be unfolded and visible while other auxiliary displays remain hidden behind the electronic device 100.

The auxiliary display 130 provides additional viewing area and advantageously provides extra antenna placement regions in the electronic device wo. The embodiments of this disclosure detail various placements of antennas and their selection in wireless devices with extendable displays.

Generally, each antenna is strategically placed to reduce the signal interference with respect to the signal radiating from other antennas of the device. One effective method to improve isolation is by physically separating the antennas from each other. Another method to improve isolation is by placing the antennas such that the polarization of the antennas are orthogonal to each other. As an example, antennas may be arranged at a horizontal and/or vertical offset in relation to each other, as the signal coupling is generally reduced as a function of its distance. As another example, antennas may be placed perpendicular to each other to create different polarizations.

Most modern wireless devices have several antennas of a number of varieties. Generally, a wireless device may have a primary cellular antenna, a diversity cellular antenna, a global positioning satellite (GPS) antenna, a WIFI antenna, and a near field communication (NFC) antenna. Other antennas may be included to achieve specific communication goals. Alternatively, some antennas may be omitted, for example, to reduce the size, complexity and/or cost of the wireless device. Additionally, to improve performance or as an alternative to the primary antenna, a wireless device may have one or more of each type of antenna. Some non-cellular antennas may be for receivers, such as in a GPS antenna, while other non-cellular antennas, such as in the WIFI antenna, may be for a transmitter and a receiver.

In a cellular device, the primary cellular antenna is the primary communication antenna and is responsible for the transmission and reception of analog and digital signals. Generally, for a mobile phone, the location of the primary cellular antenna is at the lower vertical position of the cellular device. This is typically done to reduce the specific absorption rate (SAR) and increase the total radiated power (TRP) by moving the bulk of the antenna away from the human head.

The primary cellular antenna may typically be of a planar inverted-F antenna (PIFA), a folded inverted-F antenna, a monopole antenna, a loop antenna, microstrip patch antenna, a folded inverted conformal antenna type, or a modified version of any one of the foregoing or other type of antennas. In general, many different types of antennas may be used to support the various regulatory and system requirements specific to different carriers.

In some devices, secondary cellular antennas or diversity antennas are added as an alternative to the primary cellular antenna. In a typical antenna configuration, the secondary cellular antenna or the diversity antenna is for receiving only (or for receiving and transmitting when transmit diversity is supported). As a signal is being transmitted from, for example, a cellular tower to a wireless cellular device, the receiving device may receive more than one copy of the original signal due to the multipath propagation, as a result of signal reflection and dispersion. The secondary cellular antenna may be a same antenna type as the primary cellular antenna. Alternatively, the secondary cellular antenna may be a different type of antenna that operates at a same frequency as the primary cellular antenna.

In a wireless device having multiple diversity antennas, the wireless data modem selects the strongest signal from the various signal copies received at the multiplicity of antennas. Alternatively, the wireless data modem may combine the received signals to increase the received signal power level and the signal to noise ratio (SNR) of the received signal by combining and weighing the signals from the different paths. Furthermore, in an antenna diversity scheme, multiple methods can be used to increase signal reliability.

In addition to diversity antennas, modern cellular devices may take advantage of multiple-input and multiple-output (MIMO) technology. Typically, a simple wireless communication system is usually of a single-input and single-output (SISO) type. In a SISO system, a single antenna may be used as a transmitter and a single antenna may be used as the receiver.

MIMO is a smart antenna technology that uses a multiplicity of antennas to take advantage of multipath propagation to send and receive signals simultaneously over the same radio channel. MIMO technology can be of the diversity type to improve the reliability of the signal or of the spatial-multiplexing type which increases data throughput. Other MIMO type techniques are available that improve both the reliability and data throughput. In all instances, MIMO relies on a plurality of antennas to improve wireless communication performance.

MIMO technology may have two or more antennas at each of the transmit or receive ends of the communication paths. A 2×2 MIMO is a configuration where two antennas are at the transmit end and two antennas are arranged in the receive end. A 4×4 MIMO is a configuration where four antennas are at the transmit end and four antennas are at the receive end. As another example, an 8×8 MIMO is a configuration with eight antennas at each of the transmit and receive ends. In general, the greater the number of antennas, the greater the bandwidth capacity, data speed transfer, and signal reliability.

The physical proximity of the primary and diversity antennas in a wireless device may contribute to correlation of received signal from different antennas, and as a result reduce diversity gain and MIMO throughput. Typically, the diversity antenna is arranged at the upper vertical position of the cellular device to maximize the distance between it and the primary antenna.

In an embodiment, an antenna arrangement is disclosed that increases isolation and reduces correlation between the primary and secondary antennas in a device with an extended display. In another embodiment, a ground plane slot structure separates the two ground plane regions to improve isolation and reduce correlation between antennas.

Figure 2A:
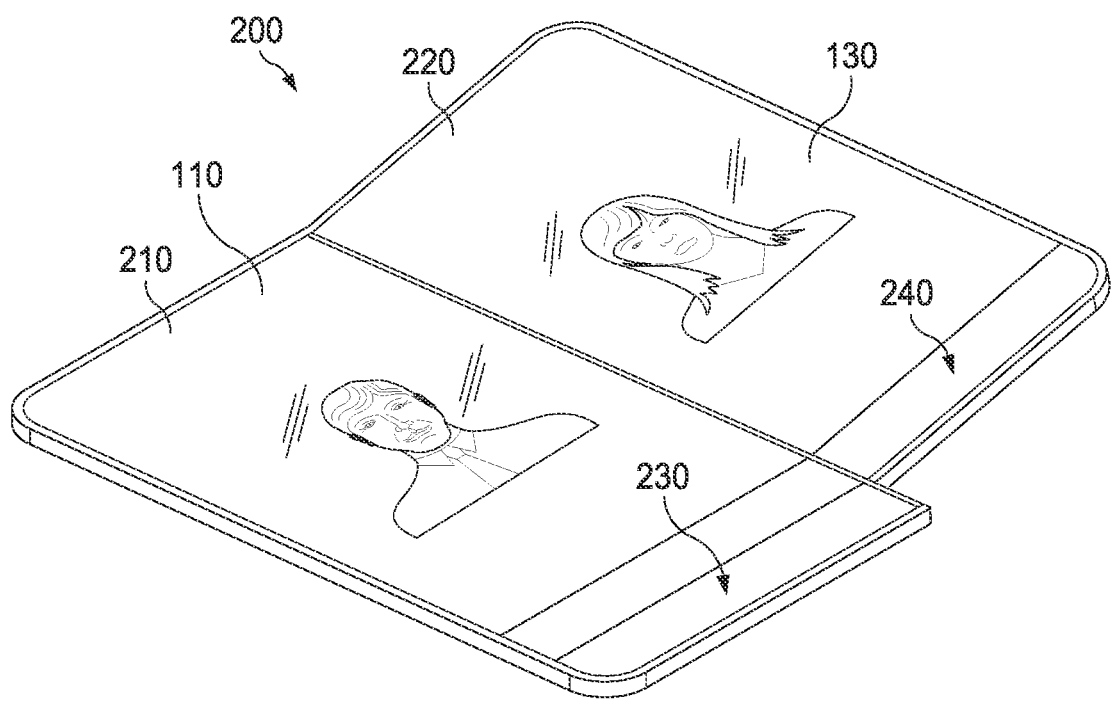
FIGS. 2A-C illustrate antenna regions of an embodiment electronic device in folded and unfolded configurations at various viewing angles.
Figure 2B:
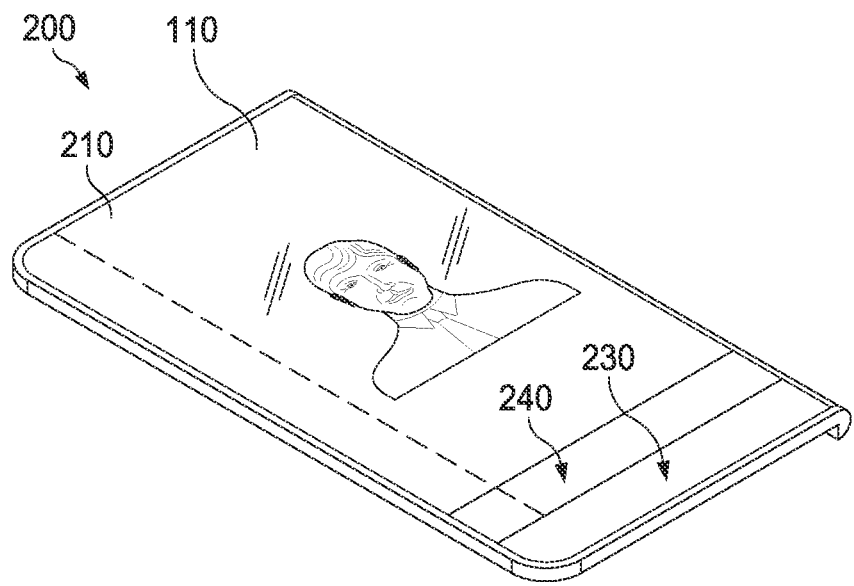
Figure 2C:
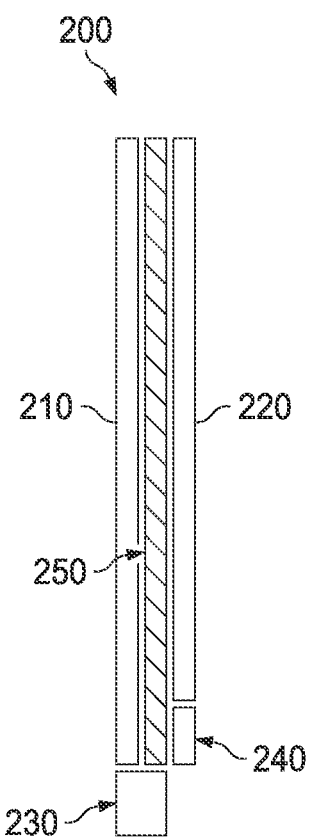

FIGS. 2A-C illustrate an embodiment electronic device 200 of this disclosure in its several configurations. The electronic device 200, as illustrated in FIGS. 2A-C, is an example embodiment of the electronic device 100 as illustrated in FIGS. 1A-D.

In FIG. 2A, the electronic device 200 is illustrated in an unfolded configuration where a main display region 110, located above a main panel 210, and an auxiliary display region 130, located above an auxiliary panel 220, are visible. Panels of the backside of the main panel 210 may be shorted to ground to deactivate the antennas located on the backside of the auxiliary panel 220 when the antennas are shorted to the ground plane 250 (FIG. 2C) in the folded configuration of the electronic device 200.

In an embodiment, the main panel 210 may comprise at least a first antenna region 230. The first antenna region 230 may be located vertically below the main display region no corresponding to the upright normal operating condition of the electronic device 200. Additional antenna regions (not shown) may be located vertically above the main display region 110, at the horizontal edge of the main display region 110, or at other advantageous locations of the main panel 210.

In an embodiment, the auxiliary panel 220 may comprise a second antenna region 240 located vertically below the auxiliary display region 220 corresponding to the upright normal operating condition of the electronic device 200. Similar to the main panel 210, additional antenna regions (not shown) may be located vertically above the auxiliary display region 130, at the horizontal edge of the auxiliary display region 130, or at other advantageous locations of the auxiliary panel 220. Generally, the provision of additional antenna regions allow for greater flexibility in the placement and selection of antennas.

Each first antenna region 230 and second antenna region 240 may contain one or more of different or same type of internal or external antennas. In an embodiment, a primary cellular antenna may be located in first antenna region 230. Additional antennas, such as a WIFI or a GPS antenna, may be positioned adjacent to the primary cellular antenna in the first antenna region 230. In an embodiment, diversity or other non-cellular type antennas may be located at other locations of the main panel 210.

In an embodiment, the second antenna region 240 may comprise one or more of diversity or non-cellular type antennas. Alternatively, in another embodiment, the second antenna region 240 may be of a cellular type acting as an alternative or additional antenna to the primary cellular antenna in a diversity or MIMO type configuration. In an embodiment, diversity or other non-cellular type antennas may be located at other locations of the auxiliary panel 220.

As shown in FIG. 2A, the first antenna region 230 and the second antenna region 240 may have a vertical and/or horizontal offset from one another in the unfolded configuration. In the case where the antennas in these regions are operating at a same frequency, the offset improves the operational performance of the antennas and reduces co-interference.

FIG. 2B illustrates an embodiment where the auxiliary panel 220 is folded behind the main panel 210 in the electronic device 200. In this folded configuration, the main display region 110 may be visible to the user. The offset between the first antenna region 230 and the second antenna region 240 prevents overlap in the folded configuration of an antenna located in one region with an antenna located in the other region.

FIG. 2C illustrates a side-view of the electronic device 200. In this side-view of the folded configuration, the antennas in the auxiliary panel 220 are deactivated when the antennas are shorted to the ground plane 250 on the backside of the main panel 210. The contact points short the antennas in the auxiliary panel 220 to the ground plane located on the backside of the main panel 210.

Figure 3A:
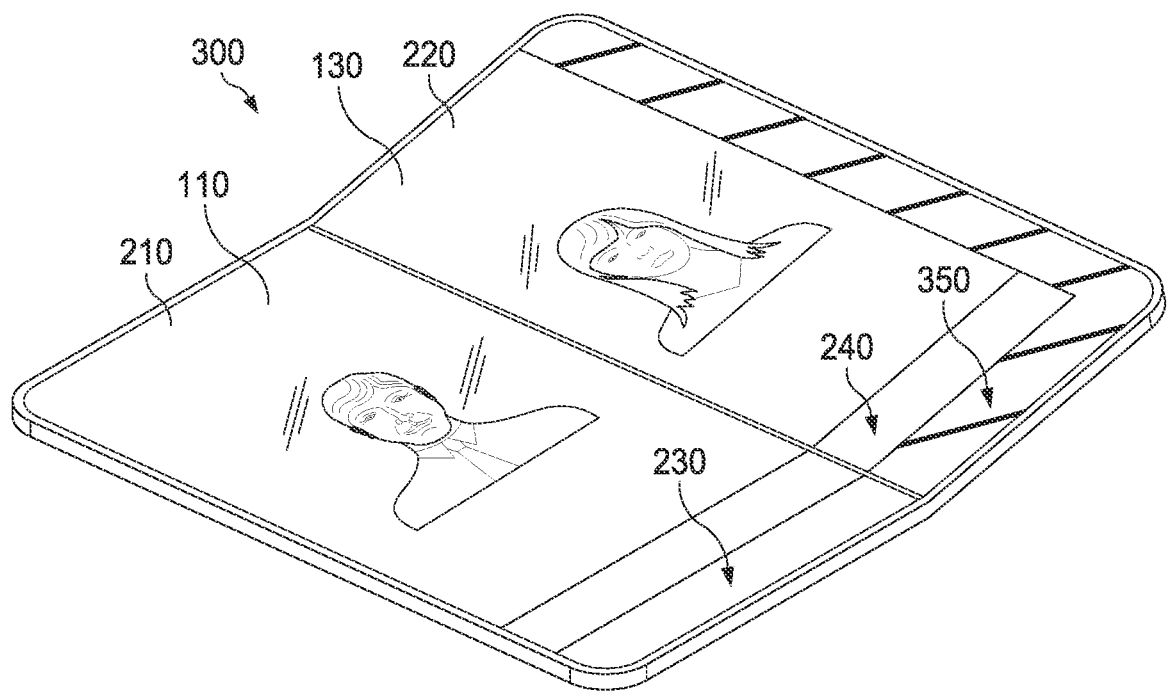
FIGS. 3A-C illustrate antenna regions of another embodiment electronic device in folded and unfolded configurations at various viewing angles.
Figure 3B:
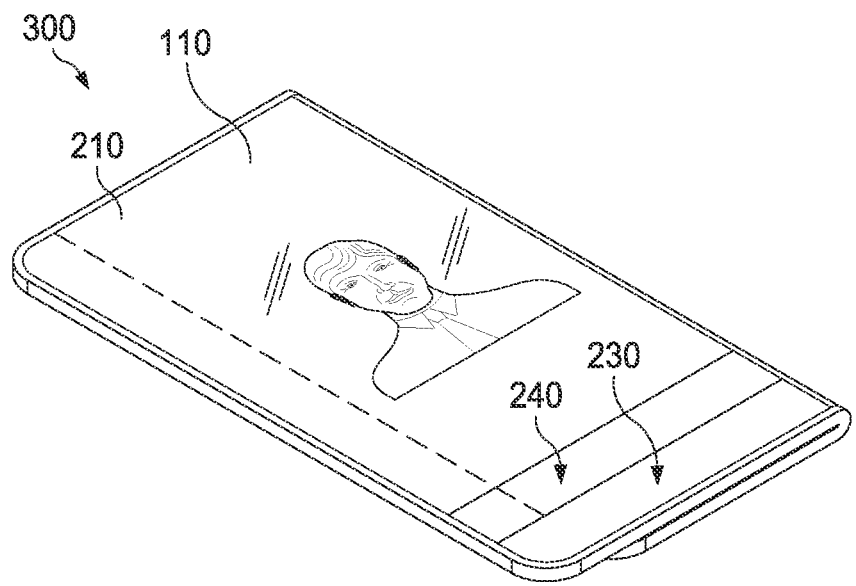
Figure 3C:
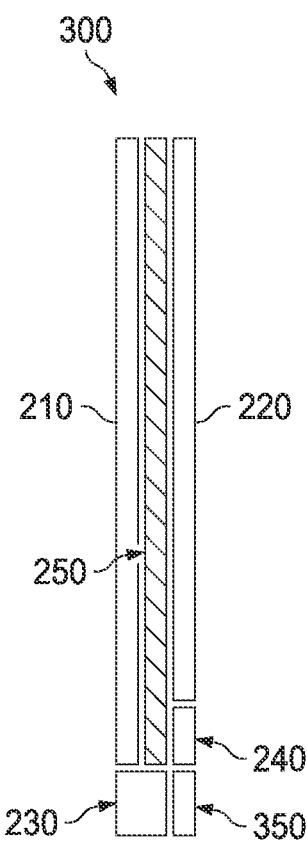

FIGS. 3A-C illustrate another embodiment electronic device 300 of this disclosure in several of its configurations. The electronic device 300, as illustrated in FIGS. 3A-C, is an example embodiment of the electronic device 100 as illustrated in FIGS. 1A-D.

FIG. 3A illustrates the electronic device 300 in an unfolded configuration. The electronic device 300 comprises a main panel 210 having a main display region 110, a first antenna region 230, and an auxiliary panel 220 having an auxiliary display region 130, and a second antenna region 240. Advantageously, the electronic device 300 includes a dielectric structure 350 in the auxiliary panel 220. The additional dielectric structure 350 expands the size of the auxiliary panel 220 to be about the same size of the main panel 210.

FIGS. 3B-C illustrate that the first antenna region 230 overlaps the dielectric structure 350 in the folded configuration. Similar to the embodiment in FIGS. 2A-C, the external antennas in the auxiliary panel 220 of the electronic device 300, such as those located in the second antenna region 240, are deactivated by short-circuiting to a ground plane 250 on the back-side of the main panel 210 in the folded configuration.

Figure 4A:
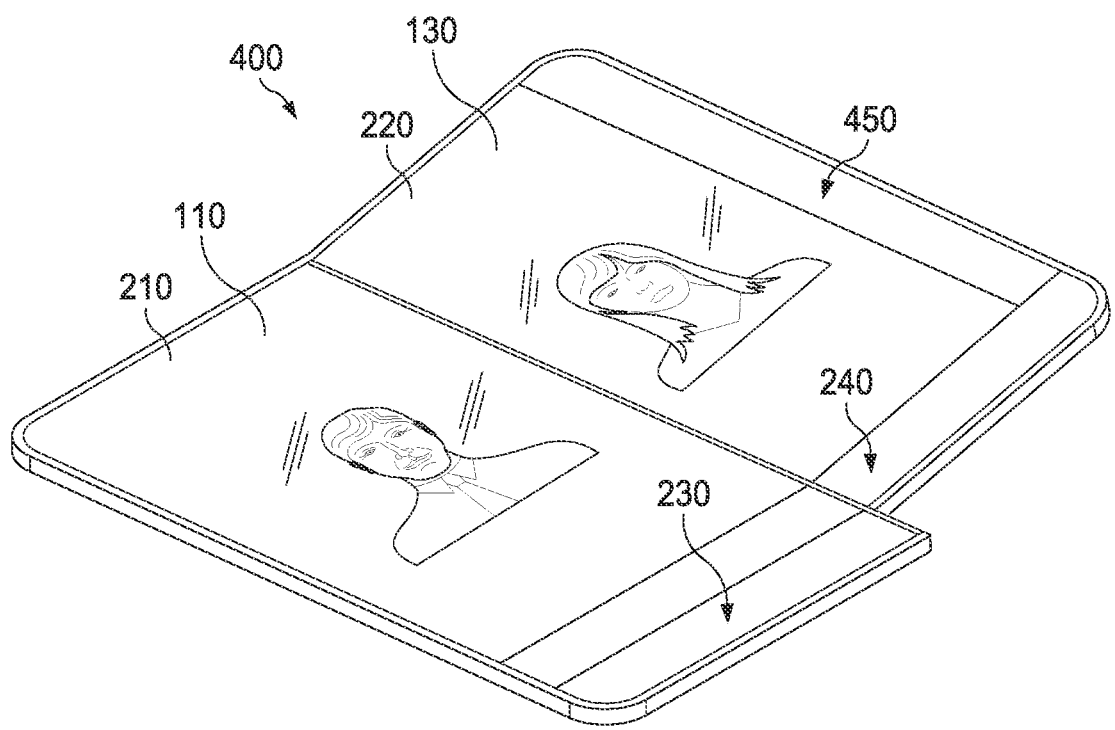
FIGS. 4A-C illustrate antenna regions of another embodiment electronic device in folded and unfolded configurations at various viewing angles.
Figure 4B:
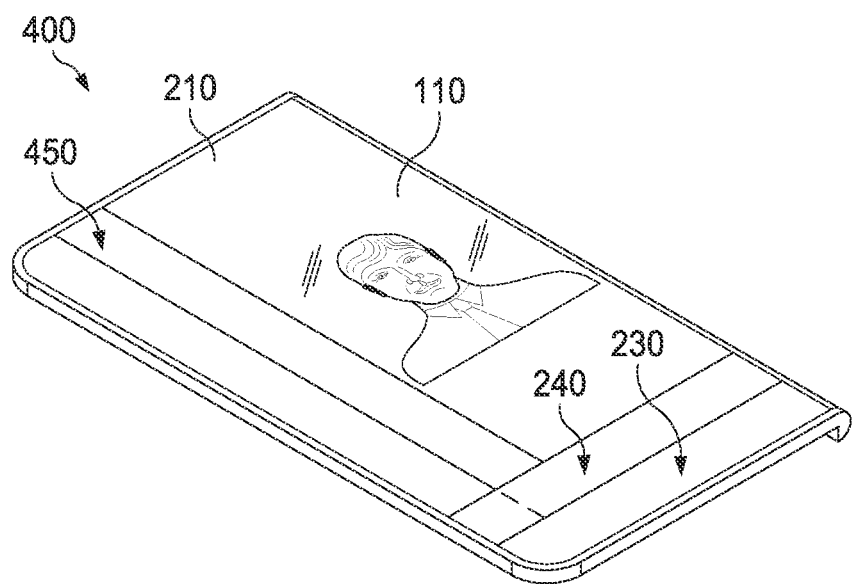
Figure 4C:
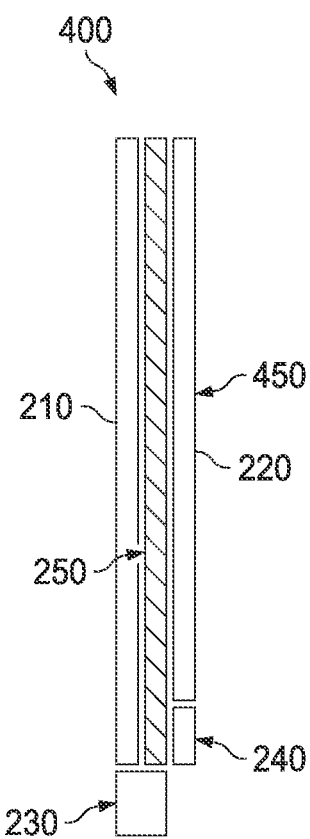

FIGS. 4A-C illustrate yet another embodiment electronic device 400 of this disclosure in several of its configurations. The electronic device 400, as illustrated in FIGS. 4A-C, is an example embodiment of the electronic device 100 as illustrated in FIGS. 1A-D.

FIG. 4A illustrates the electronic device 400 in an unfolded configuration. The electronic device 400 comprises a main panel 210 having a main display region 110 and a first antenna region 230 and an auxiliary panel 220 having an auxiliary display region 130 and a second antenna region 240. Advantageously, the electronic device 400 has a third antenna region 450 in the auxiliary panel 220. The third antenna region 450 is perpendicular to the second antenna region 240 and at the edge of the auxiliary panel 220 opposing the main panel 210 corresponding to the upright normal operating condition of the electronic device 400.

The third antenna region 450 may contain one or more of a primary cellular antenna that may be paired with the primary cellular antenna located in the first antenna region 230. The(se) additional antenna(s) may provide additional antenna selection diversity. Additionally, the(se) additional antenna(s) may be used as alternative antenna(s) to the primary cellular antenna or the diversity cellular antennas or as diversity antenna(s) for high-order MIMO and diversity operation when the electronic device 400 is in the unfolded configuration. In an alternative embodiment, other non-cellular type antennas may be additionally or alternatively located in the third antenna region 450.

FIG. 4B illustrates a front-view of the electronic device 400 in its folded configuration. FIG. 4C illustrates a side-view of the embodiment of FIG. 4B. In this folded configuration, the external antennas located in the auxiliary panel 220 may be shorted to a ground plane 250 located on the backside of the main panel 210. As illustrated in the figure, the second antenna region 240 and the third antenna region 450 do not overlap the first antenna region 230 in the folded configuration.

Figure 5A:
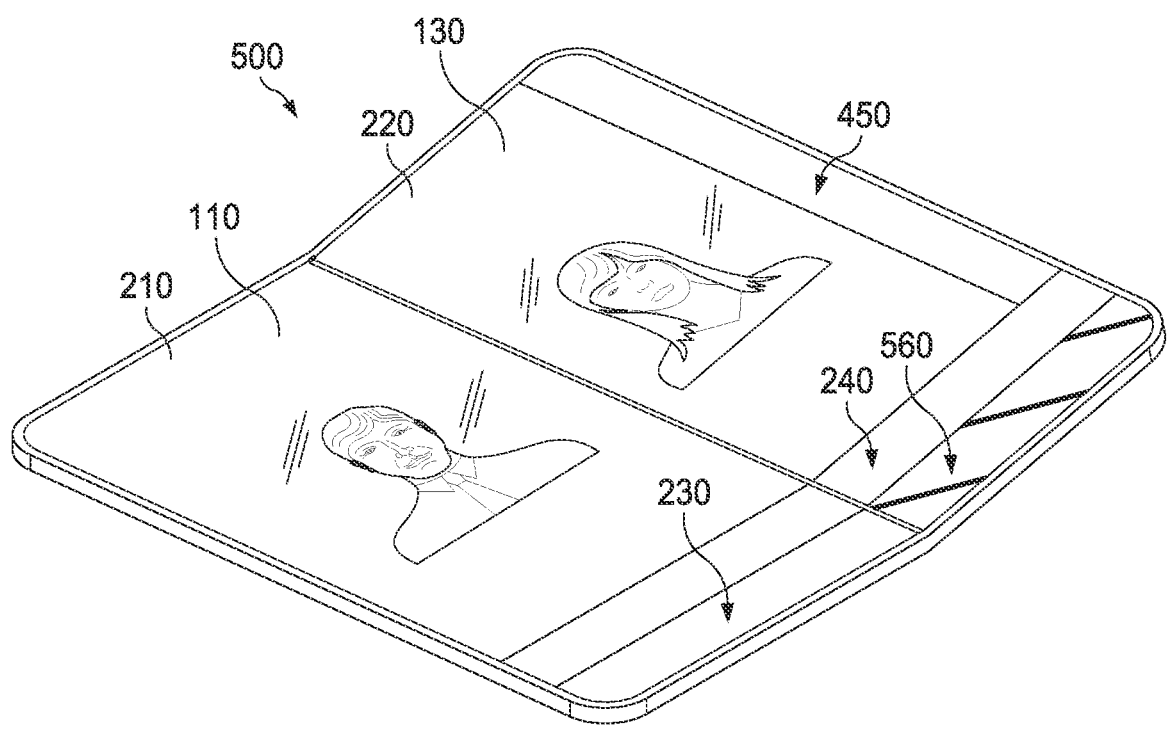
FIGS. 5A-C illustrate antenna regions of yet another embodiment electronic device in folded and unfolded configurations at various viewing angles.
Figure 5B:
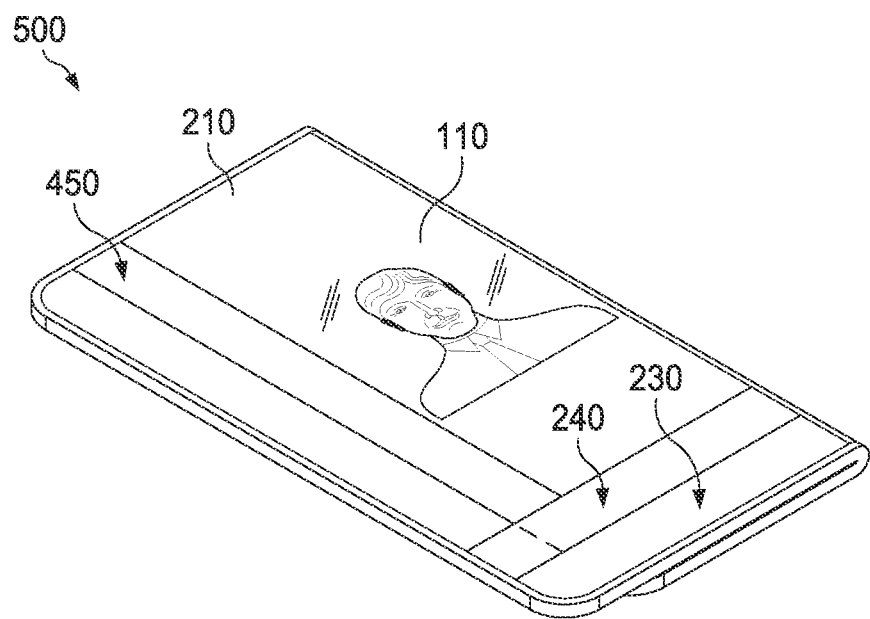
Figure 5C:
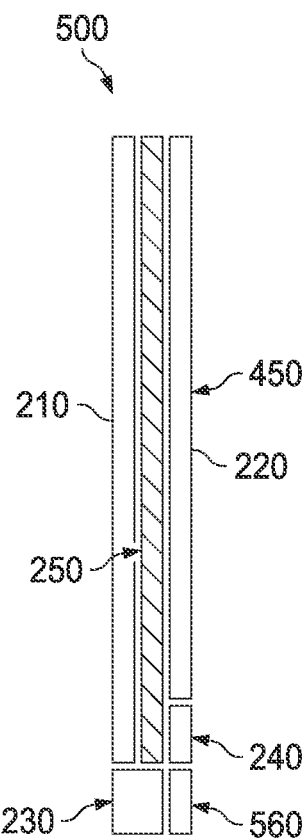

FIGS. 5A-C illustrate yet another embodiment electronic device 500 of this disclosure in several of its configurations. The electronic device 500, as illustrated in FIGS. 5A-C, is an example embodiment of the electronic device 100 as illustrated in FIGS. 1A-D.

FIG. 5A illustrates the electronic device 500 in an unfolded configuration. The electronic device 500 comprises a main panel 210 having a main display region 110 and a first antenna region 230, and an auxiliary panel 220 having an auxiliary display region 130, a second antenna region 240, and a third antenna region 450. Advantageously, the electronic device 500 has a dielectric structure 560 in the auxiliary panel 220.

FIG. 5B illustrates a front-view of the electronic device 500 in its folded configuration. FIG. 5C illustrates a side-view of the embodiment of FIG. 5B. FIGS. 5B-C illustrate that the first antenna region 230 overlaps the dielectric structure 560 in the folded configuration. Similar to the embodiment electronic device 400, as illustrated in FIGS. 4A-C, the external antenna(s) located in the second antenna region 240 and the third antenna region 450 are deactivated by shorting the antennas to a ground plane region 250 on the back-side of the main panel 210 in the folded configuration.

Figure 6:
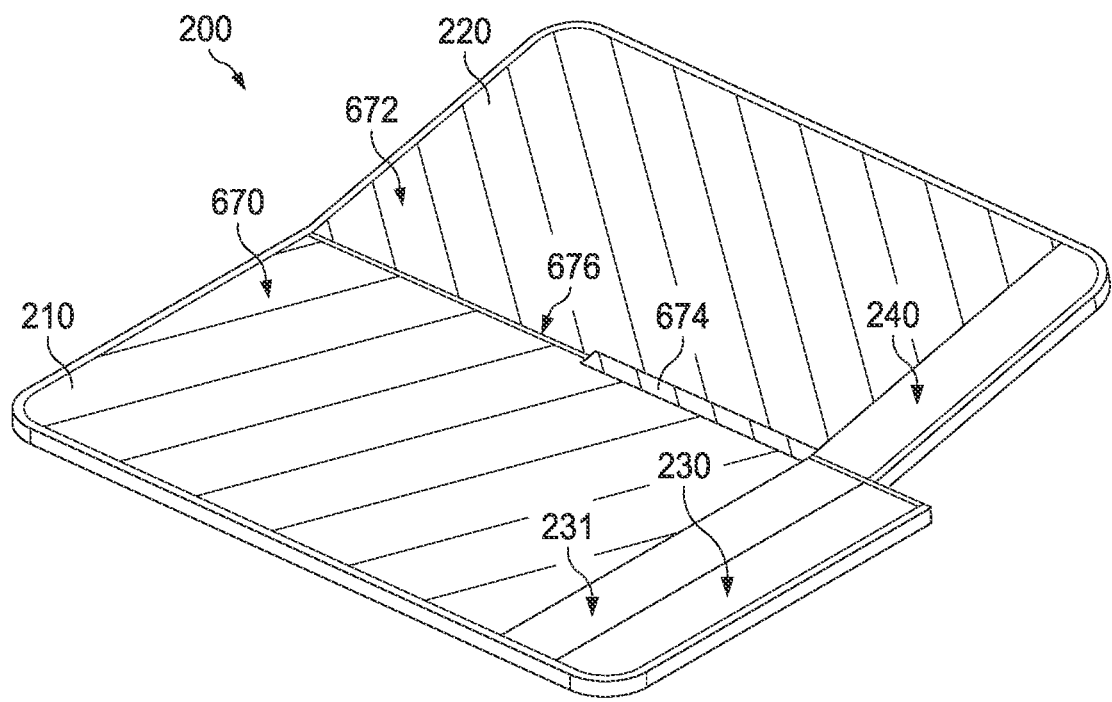
FIG. 6 illustrates a ground plane and a slot structure of an embodiment electronic device.

FIG. 6 illustrates ground plane regions 670, 672 of the main panel 210 and the auxiliary panel 220 (respectively), which are located beneath the main display region 110 and auxiliary display region 130 (respectively) of the electronic device 200 in FIGS. 2A-C. Please note that the main display region 110 and auxiliary display region 130 are not depicted in FIG. 6 so that the ground plane regions 670, 672, which are located beneath the main display region 110 and auxiliary display region 130, can be clearly viewed. It should be appreciated that the ground plane regions 670, 672 may be part of a common ground plane. A ground plane region 670 is located beneath the main display region 110. Ground plane region 670 may extend partially to region 231 to facilitate the shorting of antennas in region 240 to a ground plane when the housing is in the folded configuration. A ground plane region 672 is located beneath the auxiliary display region 130. The ground plane regions 670, 672 are generally composed of a conductive material, such as copper.

In a foldable wireless device, having a multiplicity of antennas located on several panels, the folding and unfolding may change the relative position of each antenna to one another. The change in relative position may cause a change in the impedance characteristics of the device. The antennas located in the main panel 210, such as those arranged in the first antenna region 230 of electronic device 200, may be detuned as a result of the unfolding. As a result, adaptive or passive antenna tuning methods may be introduced to minimize the impedance changes.

In an embodiment, a ground plane slot structure 674 separating the first ground plane region 670 and the second ground plane region 672 may improve antenna isolation and reduce antenna correlation between antennas positioned in the first antenna region 230 and the second antenna region 240 when the device 200 is in the unfolded configuration.

In an embodiment as illustrated in FIG. 6, the first ground plane region 670 and the second ground plane region 672 are separated, at the edge of the two displays, by a vertically placed ground plane slot structure 674. The ground plane slot structure 674 may have an electrical length approximately equal to a quarter wavelength of the operating frequency of an antenna of the electrical device 200. As an example, ground plane slot structure 674 may have a length of approximately 30 mm to provide extra isolation for two antennas operating at 2.5 GHz.

The ground plane slot structure 674 may have a narrow routing channel 676 to allow for RF and digital signals to be passed between the circuitry located between the main panel 210 and the auxiliary panel 220.

The ground plane slot structure 674 suppresses mutual coupling by acting as a resonator band-stop filter between the multiple antennas. In an embodiment, the ground plane slot structure 674 may be a resonator or a dielectric. Additional methods of creating the ground plane slot structure 674 may be used to achieve similar results. As an example, multiple slots with different lengths can be used to increase the isolation at multiple bands. In another embodiment, the ground plane slot structure 674 can have multiple branches (not shown), where each branch can have different lengths to increase the isolation over multiple bands. The effective electrical length of the ground plane slot structure 674, targeting a high isolation band over the coverage of the antennas, can be tuned electrically by RF switches or tunable capacitors. Several examples of conventional tuning circuits are illustrated in FIGS. 13B and 13C, which are described in greater detail below.

Figure 7:
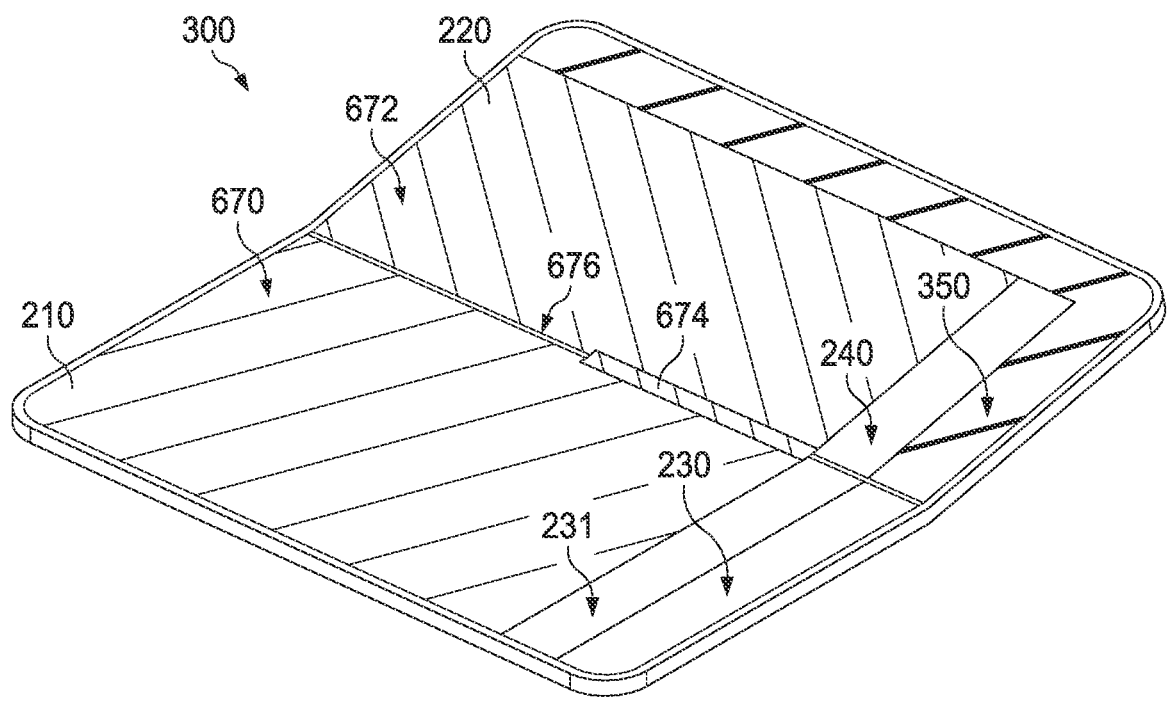
FIG. 7 illustrates a ground plane and a slot structure of another embodiment electronic device.

FIG. 7 illustrates ground plane region 670, 672 of the main panel 210 and the auxiliary panel 220 (respectively), which are located beneath the main display region 110 and the auxiliary display region 130 (respectively) of the electronic device 300 in FIGS. 3A-C. The main display region 110 and auxiliary display region 130 are not depicted in FIG. 7 so that the ground plane regions 670, 672, which are located beneath the main display region 110 and auxiliary display region 130, can be clearly viewed. The ground plane region 670 may extend partially to region 231 to facilitate the shorting of antennas in region 240 to a ground plane when the housing is in the folded configuration. The ground plane region s 670, 672 are separated by a ground plane slot structure 674 comprising a narrow opening 676.

Figure 8:
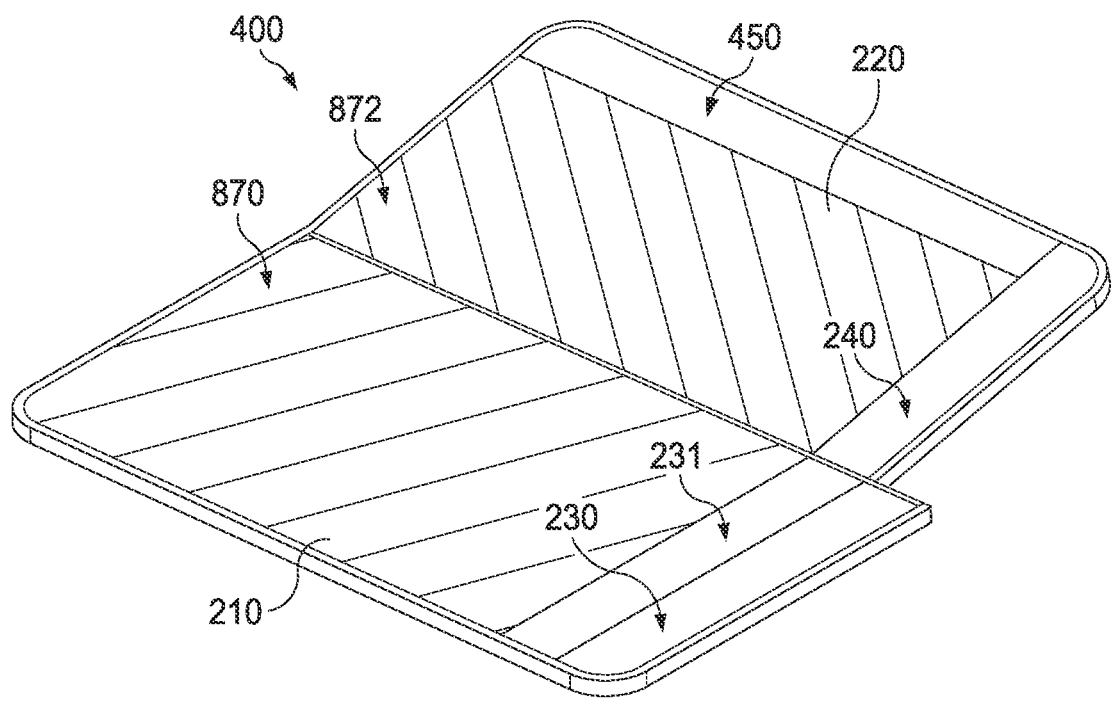
FIG. 8 illustrates a ground plane of an embodiment electronic device.

FIG. 8 illustrates a ground plane regions 870, 872 of the main panel 210 and the auxiliary panel 220 respectively located beneath the main display region 110 and the auxiliary display region 130 of the electronic device 400, as originally illustrated in FIGS. 4A-C. The main display region 110 and auxiliary display region 130 are not depicted in FIG. 8 so that the ground plane regions 870, 872, which are located beneath the main display region 110 and auxiliary display region 130 (respectively), can be clearly viewed. It should be appreciated that the ground plane regions 670, 672 may be part of a common ground plane. Ground plane region 870 may extend partially to region 231 to facilitate the shorting of antennas in region 240 to a ground plane when the housing is in a folded configuration.

Figure 9:
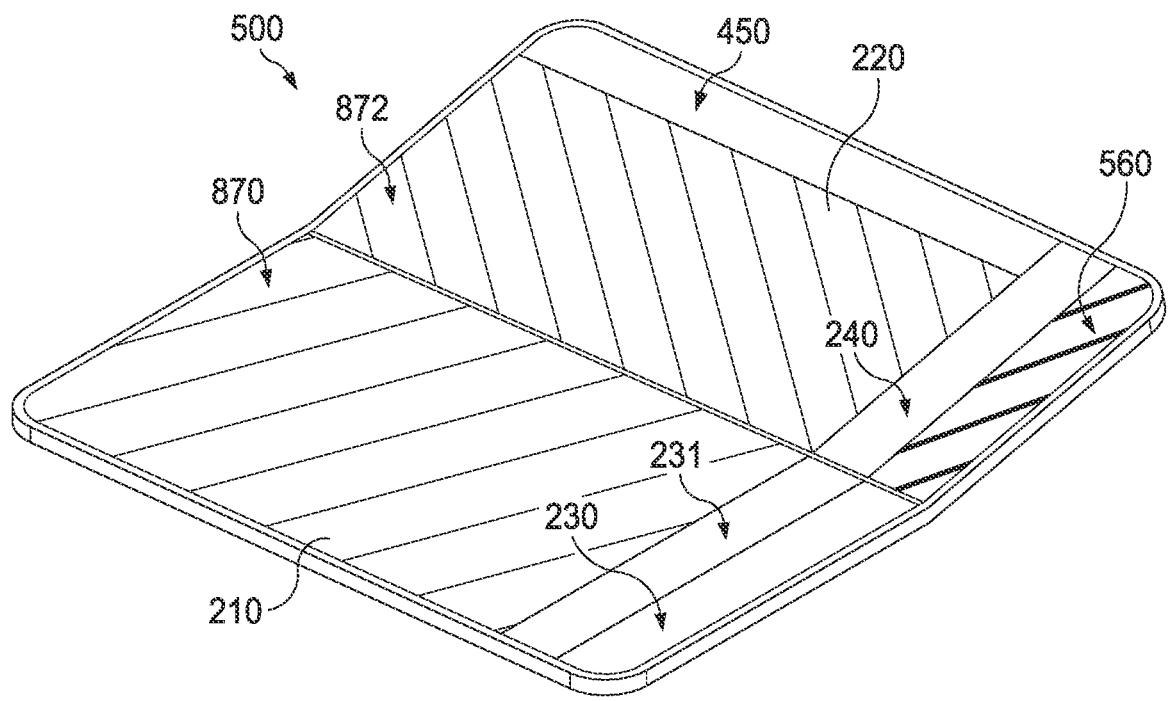
FIG. 9 illustrates a ground plane of another embodiment electronic device.

FIG. 9 illustrates a ground plane region 870 of the main panel 210 and the auxiliary panel 220 respectively located beneath the main display region 110 and the auxiliary display region 130 of the electronic device 500, as originally illustrated in FIGS. 5A-C. Similar to the electronic device 400, the continuous ground plane region extends from the area beneath the main display region 110 through the area beneath the auxiliary display region 130, and this ground plane region may extend to region 231 to facilitate the shorting of antennas in region 240 to a ground plane in the folded configuration.

In the electronic devices 400 and 500, as illustrated in FIGS. 8 and 9, the antenna(s) located in the third antenna region 450 of the auxiliary panel 220 may be an alternative and/or diversity antenna(s) to the primary cellular antenna located in the first antenna region 230 of the main panel 210. The antennas positioned in the second antenna region 240 may be non-cellular antennas or diversity antennas. The cellular antennas in the first antenna region 230 and the third antenna region 450 are isolated from each other by their physical distance and/or polarization. Therefore, the additional ground plane slot structure 674 may be unnecessary. Although, the electronic devices 400 and 500 in FIGS. 8 and 9 do not have the ground plane slot structure 674 previously described, the addition of the ground plane slot structure 674 in the electronic devices 400 and 500 may improve isolation and reduce mutual coupling between the antennas and can be advantageous.

Figure 10:
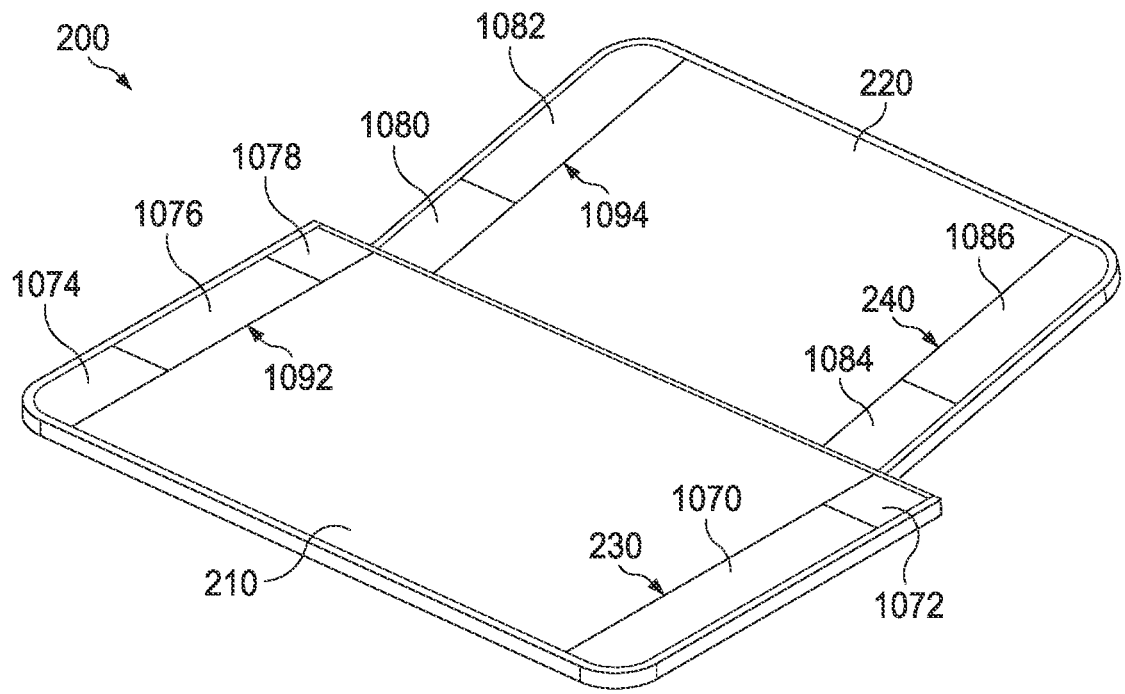
FIG. 10 illustrates placement of antennas in an embodiment electronic device.

FIG. 10 is an embodiment illustrating possible antenna placements in various antenna regions of the electronic device 200. Similar placement of antennas can be applied to the electronic device 300. The antenna arrangements, as shown, display one of the many possible arrangements of antennas in a foldable electronic device. As illustrated, an additional antenna region 1092 located at the opposite edge of the main panel 210 to the first antenna region 230 is shown, that may be used as an additional antenna placement location. Similarly, an additional antenna region 1094 located at the opposite edge of the auxiliary panel 220 to the second antenna region 240 is shown, that may be used as an additional antenna placement location. Further antenna locations (not shown) may also be used.

In an embodiment, two antennas are positioned adjacent to each other in first antenna region 230 of the main panel 210. The largest antenna 1070 (ANT0) may be a cellular antenna. The smaller antenna 1072 (ANT2) may be a primary cellular antenna operating at a different frequency band than the 1070 (ANT0) or one of a diversity antenna or non-cellular antenna such as a GPS or a WIFI antenna.

Additionally, in the top antenna region 1092 of the main panel 210, three antennas are positioned adjacent to each other. The third antenna 1078 (ANT3) and the fourth antenna 1074 (ANT4) may be one of a diversity antenna and/or non-cellular antenna. The larger antenna 1076 (ANT1) may be a cellular antenna that can transmit and receive signals or a diversity antenna operating at low bands. ANT1 may be activated in addition to or as an alternative to the primary cellular antenna ANT0 1070.

In an embodiment, in the second antenna region 240 of the auxiliary panel 220, two antennas (ANT7 1084 and ANT8 1086) may be arranged adjacent to each other. In the top antenna region 1094 of the auxiliary panel 220, two additional antennas (ANT5 1080 and ANT6 1082) are also arranged adjacent to each other. The four antennas ANT5-8 1080-1086 may be of a diversity and/or non-cellular type of an antenna and can be used as higher order diversity, MIMO antenna, or an alternative antenna to the antennas in the main panel 210.

Figure 11:
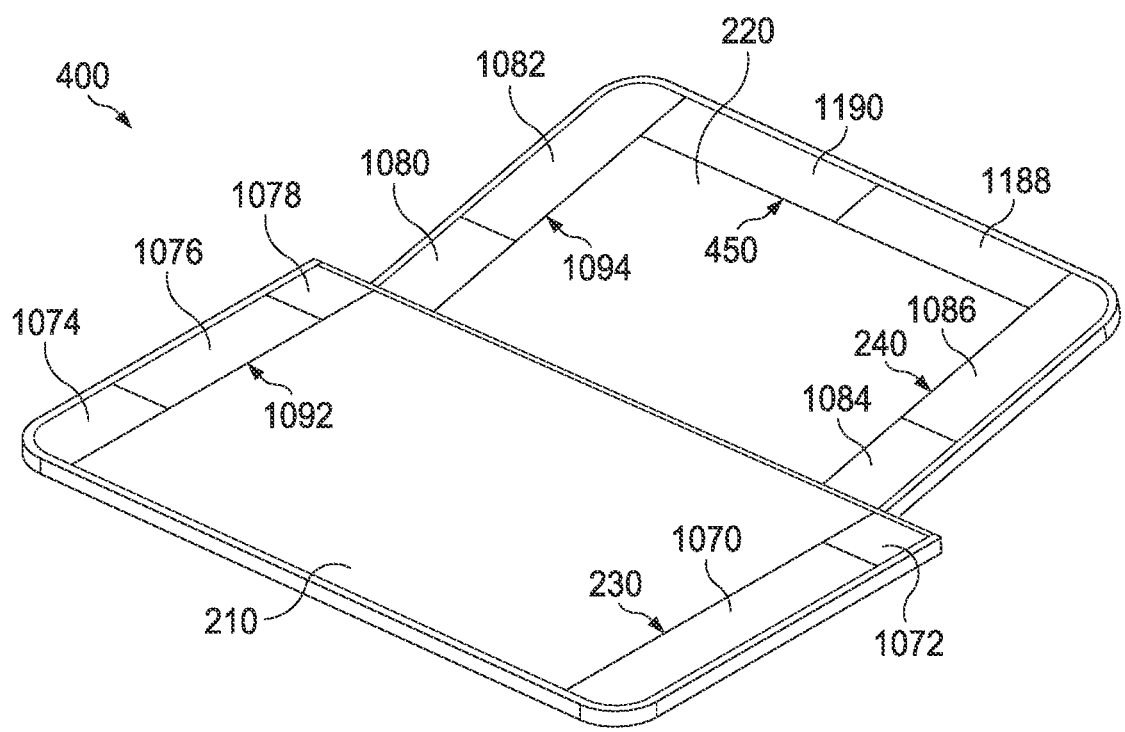
FIG. 11 illustrates placement of antennas in another embodiment electronic device.

FIG. 11 is an embodiment illustrating possible antenna placements in various antenna regions of the electronic device 400. Similar placement of antennas can be applied to the electronic device 500. The antenna arrangements, as shown, display one of the many possible arrangements of antennas in a foldable electronic device. In addition to first antenna region 230, an additional region 1092 located at the opposite edge of the main panel 210 is shown that can be used as a placement for additional antennas. Similarly, an additional region 1094 located at the opposite edge of the auxiliary panel 220 to the second antenna region 240 is shown that can be used as a placement for additional antennas in the auxiliary panel 220. Further antenna placement locations (not shown) may be used for antenna placement.

In an embodiment, and similar to the electronic device 200 as illustrated in FIG. 10, the electronic device 400 has a first antenna region 230 in the main panel 210 with two antennas that may be positioned adjacent to each other. The largest antenna 1070 (ANT0) may be a cellular antenna. The smaller antenna 1072 (ANT2) may be a primary cellular antenna operating at a different frequency band than the 1070 (ANT0) or one of a diversity antenna or non-cellular antenna type. Additionally, in the top region 1092 of the main panel 210, three antennas are positioned adjacent to each other. The third antenna 1078 (ANT3) and fourth antenna 1074 (ANT4) may be one of a diversity antenna and/or non-cellular antenna. The larger antenna 1076 (ANT1) may be a cellular antenna that can transmit and receive signals, or a diversity antenna operating at low bands. ANT1 1076 may be activated in addition to or as an alternative to the primary cellular antenna ANT0 1070.

In the second antenna region 240 of the auxiliary panel 220, two antennas (ANT7 1084 and ANT8 1086) may be arranged adjacent to each other. In the top region 1094 of the auxiliary panel 220, two additional antennas (ANT5 1080 and ANT6 1082) may be arranged adjacent to each other. The four antennas ANT5-8 1080-1086 may be of a diversity and/or non-cellular type of an antenna and can be used as higher order (4×4, 8×8) diversity, MIMO antenna, or an alternative antenna to the antennas in the main panel 210.

In the third antenna region 450 of the auxiliary panel 220, two antennas (ANT0_ALT 1190 and ANT1_ALT 1188) may be arranged adjacent to each other. ANT0_ALT 1190 and ANT1_ALT 1188 may be a cellular antenna used as an alternative to the primary antennas ANT0 1070 and ANT1

1076 in the unfolded configuration. Similar to the antennas ANT0 1070 and ANT1 1076, the antennas ANT0_ALT 1190 and ANT1_ALT 1188 may be used to transmit and receive signals in the unfolded configuration.

The arrangement of the antennas in FIGS. 10 and 11 illustrate an embodiment configuration of the multiplicity of antennas advantageously positioned to implement MIMO, diversity techniques, or any other type of multiple antenna configurations that may be selected to achieve similar results.

Generally, the electronic devices 200, 300, 400, and 500 may operate in either the folded or the unfolded configuration. Several methods may be implemented to select and activate the antennas when the device is in one of its folded or unfolded configurations. An external antenna located in one of the various regions of the auxiliary panel 220 may be shorted to a ground plane located on the backside of the main panel 210 and deactivated in the folded configuration.

As previously described, an electronic device 100 may have several antennas of a number of varieties. The auxiliary panel 220 may advantageously provide additional antenna regions that can improve data throughput, reliability, and transfer speed. As the number of active antennas in the electronic device 100 varies in the unfolded or folded configuration, several methods may be used to favorably select the operational antennas of the electronic device 100. The selection of antennas may be based on minimizing coupling between available antennas or improving data transfer.

In an embodiment, the antenna selection may be triggered based on a mechanical action of the folding of the antenna. The mechanical trigger may be at the edge or hinge of the electronic devices 200, 300, 400, and 500 or any other part of the main panel 210 or auxiliary panel 220 that can be activated as a result of the action of folding and unfolding.

Alternatively, an electronic sensor or electrical circuit may be implemented to indicate the folding or unfolding of the antennas. As an example, an optical sensor, Hall effect (magnetic) sensor may be positioned at an advantageous position on the electronic device 100 that can detect the event of folding and unfolding.

In another embodiment, the antenna selection can be triggered based on an algorithm that switches between the active antennas in accordance with a received signal strength indication (RSSI) or received signal code power (RSCP) at one or more of the antennas while the device is in the unfolded configuration 102. In an alternative embodiment, the antenna selection may be triggered based on the link control based information or power control bit (PCB), bit error rate (BER), symbol error rate (SER), negative acknowledgement (NAK)/acknowledgement (ACK) ratio, or link control based information. The antenna with highest performance is selected as the primary receive and/or transmit antenna.

As an example, and as previously mentioned in regards to multipath propagation, the receiving device may switch the primary receive chain between the active antennas in accordance with a received signal strength indication (RSSI). The wireless device modem may select the strongest signal from the various signals received at the multiplicity of antennas.

As mentioned above, in some embodiments, a shorting connection between a ground plane and an auxiliary antenna is formed as a resulting of an orientation of the auxiliary antenna to the ground plane when the housing is placed in the folded configuration. In other embodiments, the shorting connection is formed by a switch that is configured to close when the housing is placed in the folded configuration. By way example, a switch may be controlled by a configuration sensor, which actuates a normally open switch (or de-actuates a normally closed switch) to form the shorting connection upon sensing that the housing has been placed in the folded configuration.

Figure 12A:
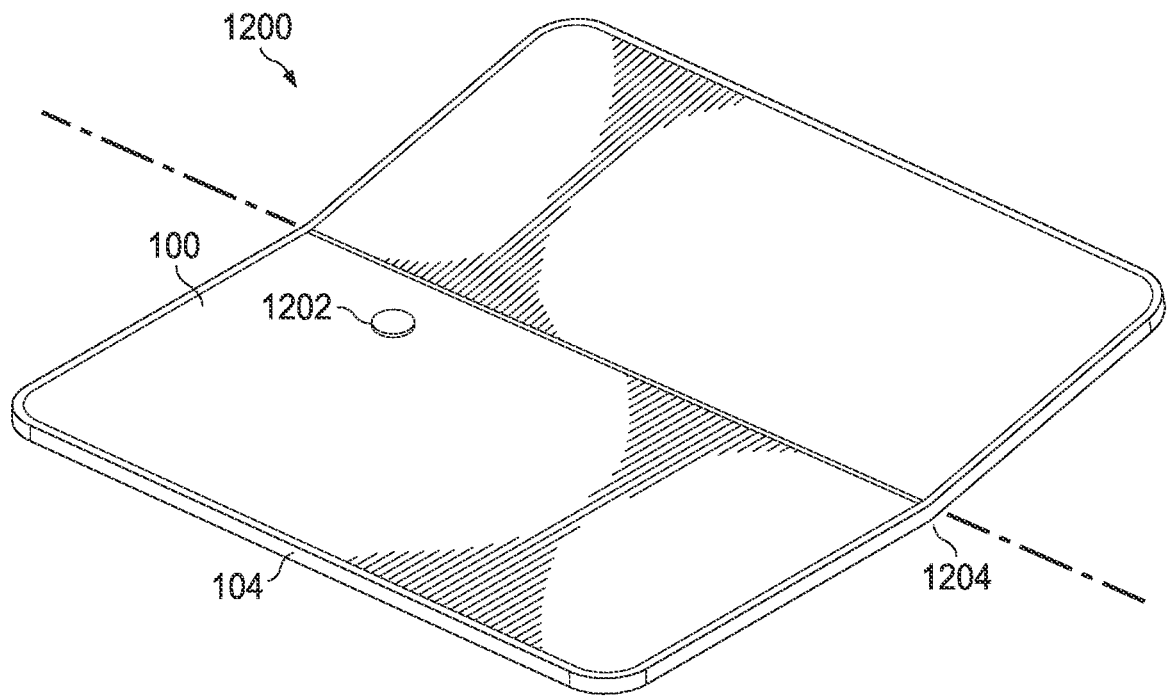
FIG. 12A illustrates an embodiment electronic device and FIG. 12B illustrates an embodiment transceiver circuit for activating/deactivating an auxiliary antenna based on a configuration of a housing of the electronic device depicted in FIG. 12A.
Figure 12B:
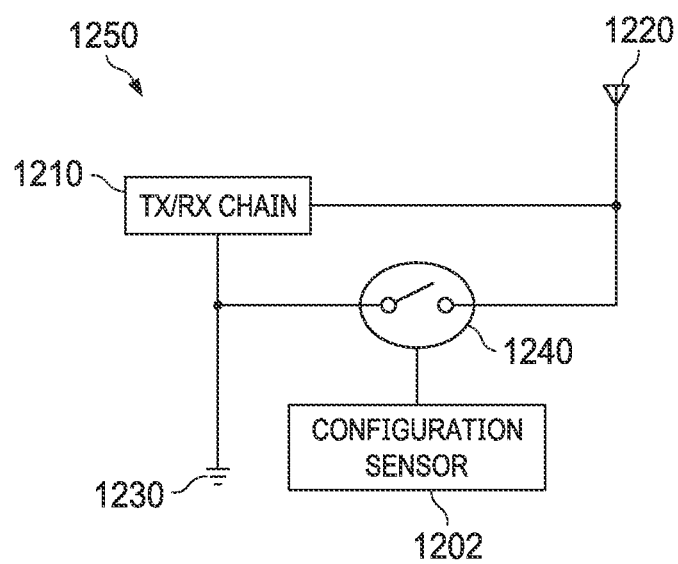

FIG. 12A illustrates an embodiment electronic device 1200, and FIG. 12B illustrates a transceiver circuit 1250 in the embodiment electronic device 1200 that includes a sensor 1202 for detecting whether a housing 104 of the embodiment electronic device 1200 is in a folded or unfolded configuration. Upon detecting that the housing 104 is in the folded configuration, the sensor 1202 closes the switch 1240, thereby forming a shorting connection between the auxiliary antenna 1220 and the ground plane 1230. Upon detecting that the housing 104 is in the unfolded configuration, the sensor 1202 opens the switch 1240, thereby allowing the transmit (TX)/receive (RX) chain 1210 to transmit/receive signals over the auxiliary antenna 1220.

The switch 1240 may be any electronic device capable of breaking a connection between the auxiliary antenna 1220 and the ground plane 1230, e.g., a normally-open/normally-closed electromagnetic switch, a transistor, etc. It should be appreciated that the configuration sensor 1202 may sense the configuration of the housing 104 in a variety of different ways. By way of example, the configuration sensor 1202 may monitor a physical orientation of a linkage 1204 (e.g., a hinge) on the housing 104, and determine that housing 104 has been placed in the folded configuration when the linkage satisfies a criteria (e.g., when an angle of the linkage is at or near 180 degrees, etc.).

As another example, the configuration sensor 1202 may monitor a relative orientation of panels coupled to the housing 104, and determine that the housing 104 has been placed in the folded configuration when the panels come into physical contact. Other examples are also possible.

FIGS. 13A-13C illustrate a block diagram of an active antenna tuner network 1300 and several examples of a conventional tuning circuit 1320 1330.

FIG. 13A Illustrates a block diagram of an embodiment active tuner network 1300, which may be installed in a host device. As shown, the active tuner network 1300 includes a modem 1302, one or more sensors 1304, an amplifier 1306, a tuning circuit 1308, and an antenna 1310, which may (or may not) be arranged as shown in FIG. 13A.

The modem 1302 may include a processor and a memory. The processor may be any component or collection of components adapted to perform computations and/or other processing related tasks, and the memory may be any component or collection of components adapted to store programming and/or instructions for execution by the processor.

The sensors 1304 may include one or more of a capacitive touch sensor, a proximity sensor, or a sensor probe that detects a change in the loading condition of the antenna 1310. The sensors may, for example, include a high pass filter or a detector circuit that determines antenna loading conditions. The change in the loading condition may be a result of a user's hand interfering with the transmission/reception of wireless signals by the antenna. In another example, the loading condition may be a result of the interference or interaction between the multiple antennas in the wireless device in the folded and the unfolded configuration of the wireless device.

The amplifier 1306 may be a high power amplifier in the transmit path and a low noise amplifier in the receive path. In an embodiment, the amplifier 1306 may include several amplifiers to amplify the signal in multiple stages (not shown). The receive path and the transmit path may be isolated from each other using a circulator or a switch (not shown). In the transmit configuration, the amplifier 1306 receives a signal from the modem and amplifies the signal to be transmitted via the antenna 1310. In the receive configuration, the amplifier 1306 receives a signal from the antenna 1310 and amplifies the signal to be received at the modem 1302.

The tuning circuit 1308 includes one or more circuits comprising one or more of a capacitor and/or an inductor. In an embodiment, the tuning circuit 1308 may also comprise a switch that switches between several matched networks based on a control signal. In another embodiment, the tuning circuit 1308 may comprise a plurality of capacitors and inductors that are switched in and out of the circuit to match the impedance at the load. Those of ordinary skill in the art will appreciate that the tuning circuit 1308 may comprise a variety of components and schematics to match the impedance at the antenna as a result of a variable load. FIGS. 13B-C illustrate a few examples of a simple RF tuning circuit, which are further described below.

In the transmit and receive configurations, the modem 1302 receives the loading condition status from the sensors 1304. The modem 1302 determines the appropriate matching network at the tuning circuit 1308. The modem 1302 sends a control signal to the tuning circuit 1308, for example, upon detecting of a change in the loading condition of the antenna, to adapt and match to the impedance change at the antenna 1310.

FIG. 13B illustrates a conventional parallel-resonant tuning circuit 1320 that includes an inductor 1322 and a capacitor 1324 arranged in parallel. FIG. 13C illustrates a conventional series-resonant tuning circuit 1330 that includes an inductor 1334 and a capacitor 1334 arranged in series. The tuning circuit 1308 in FIG. 13A may include one or more of each of the parallel-resonant tuning circuit 1320 and the series-resonant tuning circuit 1330. The various components may include other components, for example, a switch (not shown) that can vary the arrangement of components to achieve a desired tuning network. In some embodiments, the capacitor 1324 1334 and inductor 1322 1324 may be a variable capacitor and a variable inductors and may be adaptively tuned.

FIG. 14 illustrates a block diagram of an embodiment processing system 1400 for performing methods described herein, which may be installed in a host device. As shown, the processing system 1400 includes a processor 1404, a memory 1406, and interfaces 1410-1414, which may (or may not) be arranged as shown in FIG. 14. The processor 1404 may be any component or collection of components adapted to perform computations and/or other processing related tasks, and the memory 1406 may be any component or collection of components adapted to store programming and/or instructions for execution by the processor 1404. In an embodiment, the memory 1406 includes a non-transitory computer readable medium. The interfaces 1410, 1412, 1414 may be any component or collection of components that allow the processing system 1400 to communicate with other devices/components and/or a user. For example, one or more of the interfaces 1410, 1412, 1414 may be adapted to communicate data, control, or management messages from the processor 1404 to applications installed on the host device and/or a remote device. As another example, one or more of the interfaces 1410, 1412, 1414 may be adapted to allow a user or user device (e.g., personal computer (PC), etc.) to interact/communicate with the processing system 1400. The processing system 1400 may include additional components not depicted in FIG. 14, such as long-term storage (e.g., non-volatile memory, etc.).

In some embodiments, the processing system 1400 is included in a network device that is accessing, or part otherwise of, a telecommunications network. In one example, the processing system 1400 is in a network-side device in a wireless or wireline telecommunications network, such as a base station, a relay station, a scheduler, a controller, a gateway, a router, an applications server, or any other device in the telecommunications network. In other embodiments, the processing system 1400 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network, directly or indirectly through an intermediary device.

In some embodiments, one or more of the interfaces 1410, 1412, 1414 connects the processing system 1400 to a transceiver adapted to transmit and receive signaling over the telecommunications network. FIG. 15 illustrates a block diagram of a transceiver 1400 adapted to transmit and receive signaling over a telecommunications network. The transceiver 1500 may be installed in a host device. As shown, the transceiver 1500 comprises a network-side interface 1502, a coupler 1504, a transmitter 1506, a receiver 1508, a signal processor 1510, and a device-side interface 1512. The network-side interface 1502 may include any component or collection of components adapted to transmit or receive signaling over a wireless or wireline telecommunications network. The coupler 1504 may include any component or collection of components adapted to facilitate bi-directional communication over the network-side interface 1502. The transmitter 1506 may include any component or collection of components (e.g., up-converter, power amplifier, etc.) adapted to convert a baseband signal into a modulated carrier signal suitable for transmission over the network-side interface 1502. The receiver 1508 may include any component or collection of components (e.g., down-converter, low noise amplifier, etc.) adapted to convert a carrier signal received over the network-side interface 1502 into a baseband signal. The signal processor 1510 may include any component or collection of components adapted to convert a baseband signal into a data signal suitable for communication over the device-side interface(s) 1512, or vice-versa. The device-side interface(s) 1512 may include any component or collection of components adapted to communicate data-signals between the signal processor 1510 and components within the host device (e.g., the processing system 1400, local area network (LAN) ports, etc.).

The transceiver 1400 may transmit and receive signaling over any type of communications medium. In some embodiments, the transceiver 1500 transmits and receives signaling over a wireless medium. For example, the transceiver 1500 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1502 comprises one or more antenna/radiating elements. For example, the network-side interface 1502 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1500 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. An electronic device comprising:
   a housing comprising a first panel coupled to a second panel;
   a first antenna positioned adjacent to the first panel;
   a first display disposed in the first panel;
   a first ground plane region positioned adjacent to the first display;
   a second display disposed in the second panel;
   a second ground plane region positioned adjacent to the second display, wherein the second ground plane region and the first ground plane region are part of a common ground plane,
   the first panel and the first ground plane region on a first side of an edge separating the first panel and the second panel when the housing is placed in an unfolded configuration, and the second panel and the second ground plane region on a second side of the edge when the housing is placed in the unfolded configuration;
   a second antenna positioned adjacent to the second panel, the second antenna configured to be activated when the housing is placed in the unfolded configuration and to be deactivated responsive to the second antenna at least partially contacting the first ground plane region when the housing is placed in a folded configuration; and
   a ground plane slot structure positioned between the first ground plane region and the second ground plane region electrically isolating the first antenna from the second antenna.

2. The electronic device of claim 1, wherein the ground plane slot structure is formed of a dielectric material having an approximate electrical length corresponding to a quarter wavelength of an operating frequency of one of the first or second antennas.

3. The electronic device of claim 1, wherein the ground plane slot structure is a resonator having an approximate electrical length corresponding to a quarter wavelength of an operating frequency of one of the first or second antennas.

4. The electronic device of claim 1, wherein the first display is active when the housing is in the folded configuration, and the first display and the second display are both active when the housing is in the unfolded configuration.

5. The electronic device of claim 1, wherein the ground plane slot structure is provided with a passage configured to carry one or more of data or power signals between the first panel and the second panel.

6. The electronic device of claim 1, wherein a shorting connection between the second antenna and the common ground plane is formed when the housing is transitioned from the unfolded configuration to the folded configuration.

7. The electronic device of claim 6, wherein the shorting connection between the second antenna and the common ground plane is broken when the housing is in the unfolded configuration.

8. The electronic device of claim 6, wherein the shorting connection is formed when the second antenna comes into direct or indirect contact with the common ground plane incident to placement of the housing in the folded configuration.

9. The electronic device of claim 6, wherein the shorting connection is formed by a switch that is configured to close when the housing is placed in the folded configuration.

10. The electronic device of claim 6, further comprising a switch that is configured to activate the second antenna when the housing is in the unfolded configuration.

11. The electronic device of claim 6, wherein the shorting connection is formed by a switch coupled to the housing and is configured to close when the housing is placed in the folded configuration.

12. The electronic device of claim 1, further comprising a processor that is configured to execute instructions to select the second antenna in accordance with one or more of received signal strength indication (RSSI), received signal code power (RSCP), bit error rate (BER), symbol error rate (SER), negative acknowledgement (NAK)/acknowledgement (ACK) ratio, link control based information, and power control bit (PCB).

13. The electronic device of claim 1, wherein the second antenna is configured to operate as a diversity antenna to the first antenna.

14. The electronic device of claim 1, wherein each of the first antenna and the second antenna are configured to operate as multiple-input and multiple-output (MIMO) antennas.

15. The electronic device of claim 1, wherein the second antenna does not overlap the second antenna when the housing is in the folded configuration.

16. The electronic device of claim 1, wherein the first antenna and the second antenna are different types of wireless antennas.

17. The electronic device of claim 1, wherein the electronic device further includes a main display region disposed in the first panel and an auxiliary display region disposed in the second panel, the main display region being active when the housing is in the folded configuration and both the main display region and the auxiliary display region being active when the housing is in the unfolded configuration.

18. The electronic device of claim 1, wherein the electronic device further includes a plurality of auxiliary displays folded accordion style behind the first display.

19. The electronic device of claim 1, wherein the first antenna and the second antenna are arranged at a horizontal offset in relation to each other.

20. The electronic device of claim 1, wherein the first antenna and the second antenna are arranged at a vertical offset in relation to each other.

21. The electronic device of claim 1, wherein the first antenna and the second antenna are arranged perpendicular to each other.

* * * * *